US010567599B2

(12) United States Patent
Shinoda

(10) Patent No.: US 10,567,599 B2
(45) Date of Patent: Feb. 18, 2020

(54) IMAGE PROCESSING APPARATUS AND METHOD FOR PROCESSING IMAGE

(71) Applicant: Panasonic Intellectual Property Management Co., Ltd., Osaka (JP)

(72) Inventor: Masayo Shinoda, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/200,693

(22) Filed: Nov. 27, 2018

(65) Prior Publication Data

US 2019/0098149 A1 Mar. 28, 2019

Related U.S. Application Data

(63) Continuation of application No. PCT/JP2017/020903, filed on Jun. 6, 2017.

(30) Foreign Application Priority Data

Jun. 30, 2016 (JP) .................. 2016-130312

(51) Int. Cl.
*H04N 1/00* (2006.01)
*G06K 9/00* (2006.01)
(Continued)

(52) U.S. Cl.
CPC ......... *H04N 1/00336* (2013.01); *A45D 33/38* (2013.01); *A45D 34/04* (2013.01);
(Continued)

(58) Field of Classification Search
CPC ................................. H04N 1/00336
(Continued)

(56) References Cited

U.S. PATENT DOCUMENTS

2014/0120144 A1 5/2014 Abe et al.
2015/0049111 A1* 2/2015 Yamanashi ........... G06T 11/001
345/632
(Continued)

FOREIGN PATENT DOCUMENTS

JP 2012-012317 1/2012
JP 2012-012337 1/2012
(Continued)

OTHER PUBLICATIONS

International Search Report of PCT application No. PCT/JP2017/020903 dated Jul. 11, 2017.

*Primary Examiner* — Jacky X Zheng
(74) *Attorney, Agent, or Firm* — Greenblum & Bernstein, P.L.C.

(57) ABSTRACT

An image processing apparatus is an image processing apparatus that generates image data used to print images on a sheet appliable to the skin. The image processing apparatus includes an image determiner that determines a makeup article image whose target position on the face is determined in accordance with facial feature points and an assist mark image whose target position on the face is determined in accordance with the facial feature points and a printing controller that generates the image data including contents indicating that the determined makeup article image and the determined assist mark image are to be printed on the sheet, the determined assist mark image printed at a position corresponding to a printing position of the determined makeup article image.

16 Claims, 14 Drawing Sheets

(51) Int. Cl.
  *A45D 33/38*  (2006.01)
  *A45D 34/04*  (2006.01)
  *G06T 7/73*  (2017.01)
  *A45D 44/00*  (2006.01)
  *B41M 5/00*  (2006.01)

(52) U.S. Cl.
  CPC ........... *A45D 44/00* (2013.01); *A45D 44/005* (2013.01); *B41M 5/0076* (2013.01); *G06K 9/00248* (2013.01); *G06K 9/00268* (2013.01); *G06K 9/00281* (2013.01); *G06T 7/73* (2017.01); *G06T 2207/30201* (2013.01)

(58) Field of Classification Search
  USPC .......................................................... 358/1.9
  See application file for complete search history.

(56) References Cited

U.S. PATENT DOCUMENTS

| | | | |
|---|---|---|---|
| 2016/0015152 A1 | 1/2016 | Ajiki et al. | |
| 2016/0022014 A1 | 1/2016 | Ajiki et al. | |
| 2016/0143422 A1 | 5/2016 | Yamanashi et al. | |
| 2016/0357578 A1* | 12/2016 | Kim | G06T 11/001 |
| 2017/0348982 A1* | 12/2017 | Wong | A45D 33/02 |

FOREIGN PATENT DOCUMENTS

| | | |
|---|---|---|
| JP | 2012-012339 | 1/2012 |
| JP | 2014-147560 | 8/2014 |
| JP | 2015-043836 | 3/2015 |
| WO | 2012/173198 | 12/2012 |
| WO | 2014/147938 | 9/2014 |
| WO | 2014/147940 | 9/2014 |

* cited by examiner

FIG. 5

| EYESHADOW | | BLUSHER | | CONCEALER | | LIPSTICK | | HIGHLIGHTER | |
|---|---|---|---|---|---|---|---|---|---|
| E1 | | B1 | | C1 | | L1 | | H1 | |
| E2 | | B2 | | C2 | | L2 | | H2 | |
| E3 | | B3 | | C3 | | L3 | | H3 | |
| ⋮ | | ⋮ | | ⋮ | | ⋮ | | ⋮ | |

FIG. 6

| ASSIST MARK TYPE \ MAKEUP ARTICLE TYPE | EYESHADOW | | BLUSHER | | CONCEALER | | LIPSTICK | | HIGHLIGHTER | ⋮ |
|---|---|---|---|---|---|---|---|---|---|---|
| SURROUNDING MARK | | 0.25 | | 0.95 | | 0.70 | | 0.80 | | ⋮ |
| ONE-POINT MARK | | 0.70 | | 0.45 | | 0.60 | | 0.70 | | ⋮ |
| TWO-POINT MARK | | 0.82 | | 0.40 | | 0.50 | | 0.55 | | ⋮ |
| THREE-POINT MARK | | 1.00 | | 0.50 | | 0.21 | | 1.00 | | ⋮ |
| CROSS MARK | | 0.85 | | 0.30 | | 0.55 | | 0.90 | | ⋮ |
| LINE MARK | | 0.45 | | 1.00 | | 0.65 | | 0.60 | | ⋮ |
| ⋮ | | ⋮ | | ⋮ | | ⋮ | | ⋮ | | ⋮ |

IMAGE PROCESSING APPARATUS AND METHOD FOR PROCESSING IMAGE

BACKGROUND

1. Technical Field

The present disclosure relates to an image processing apparatus and a method for processing an image that generates image data used to print images on a sheet appliable to the skin.

2. Description of the Related Art

Sheets appliable to the skin and provided with a functional constituent (e.g., a cosmetic agent, a medicine, etc.) are known (e.g., refer to International Publication No. 2012/173198, Japanese Patent No. 5580670, Japanese Patent No. 5580671, and Japanese Patent No. 5514014). A technique for forming an image on a sheet by printing a colored functional constituent in a certain shape and a certain size is also known (e.g., refer to Japanese Unexamined Patent Application Publication No. 2015-43836). A user can easily make up her face (hereinafter simply referred to as "makeup") or care her skin by applying a sheet to the skin while moving an image on the sheet to a target position (a position on the skin at which the image on the sheet is to be disposed).

SUMMARY

In the above examples of the related art, however, the user holds a sheet by hand and applies the sheet to the skin. An image on the applied sheet, therefore, might be deviated from a target position.

If a sheet application position is deviated from a target position, makeup or care is not appropriately performed. The user therefore needs to apply the sheet again, which is troublesome. A technique for enabling the user to easily apply a sheet at an appropriate position, therefore, is desired.

One non-limiting and exemplary embodiment provides an image processing apparatus and a method for processing an image capable of enabling the user to easily apply a sheet at an appropriate position.

In one general aspect, the techniques disclosed here feature an image processing apparatus that generates image data used to print images on a sheet appliable to skin. The image processing apparatus includes an image determiner that determines a makeup article image whose target position on a face is determined in accordance with facial feature points and an assist mark image whose target position on the face is determined in accordance with the facial feature points and a printing controller that generates the image data including contents indicating that the determined makeup article image and the determined assist mark image are to be printed on the sheet, the determined assist mark image printed at a position corresponding to a printing position of the determined makeup article image.

According to the aspect of the present disclosure, the user can easily apply a sheet at an appropriate position.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a makeup article image table according to the present disclosure;

FIG. 6 is a diagram illustrating an example of an assist mark image table according to the present disclosure;

DETAILED DESCRIPTION

An embodiment of the present disclosure will be described in detail hereinafter with reference to the drawings.

Underlying Knowledge Forming Basis of Invention

When a user applies a sheet on which a makeup article (e.g., eyeshadow, blusher, etc.) is printed to the skin of her face, for example, the user holds the sheet by hand (includes fingers; the same holds in the following description) and moves the makeup article on the sheet to a target position of the makeup article (a position on the skin of the face at which the makeup article is to be disposed) while checking a position of the makeup article printed on the sheet and the target position using a mirror or the like. If the sheet or the hand holding the sheet overlaps the target position at this time, it becomes difficult to check the target position, and the sheet might be applied with the makeup article deviated from the target position. When the makeup article on the sheet is deviated from the target position, the makeup looks poor, and the user needs to apply the sheet again, which is troublesome.

It is possible to print a makeup article that tolerates deviation on a sheet, but a shape and a size of the makeup article are undesirably limited in order to tolerate deviation, and a makeup article that follows a trend might not be provided.

The present invention, therefore, enables the user to easily apply a sheet at an appropriate position without causing a deviation between a makeup article on the sheet and a target position.

System Configuration

First, an outline of a makeup assist system including an image processing apparatus according to the present embodiment will be described with reference to FIG. 1.

Figure 1:
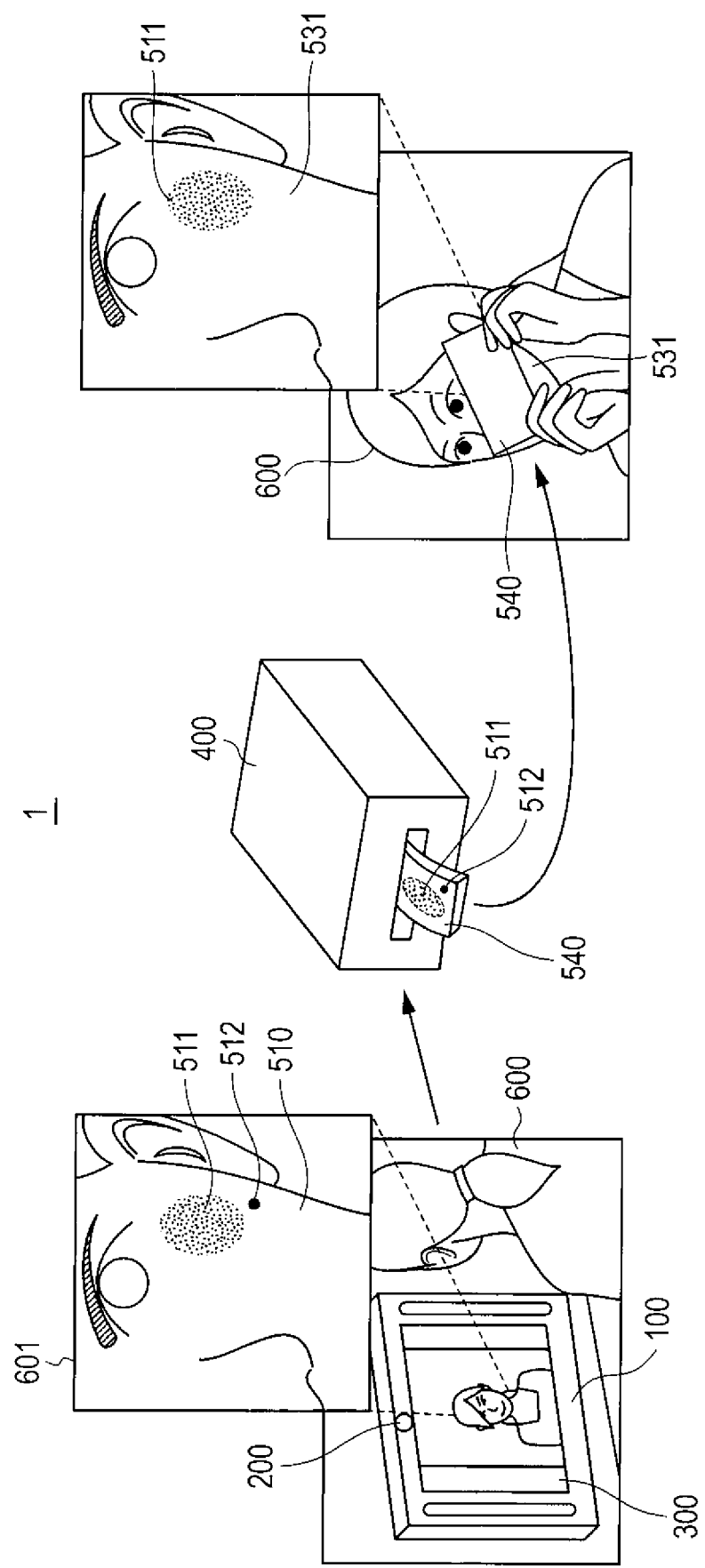
FIG. 1 is a schematic diagram illustrating an outline of an example of a makeup assist system according to the present disclosure.

FIG. 1 is a schematic diagram illustrating an outline of an example of the makeup assist system.

A makeup assist system 1 illustrated in FIG. 1 is provided, for example, in a factory, a cosmetics store, a beauty salon, a medical facility, a makeup room for tidying up oneself, an event venue, or a person's house.

In FIG. 1, the makeup assist system 1 includes an image processing apparatus 100, an imaging apparatus 200, a display apparatus 300, and a printing apparatus 400. The image processing apparatus 100 and the printing apparatus 400 are provided, for example, in a factory, a cosmetics store, a beauty salon, a medical facility, a makeup room for tidying up oneself, an event venue, or a person's house.

Figure 3:
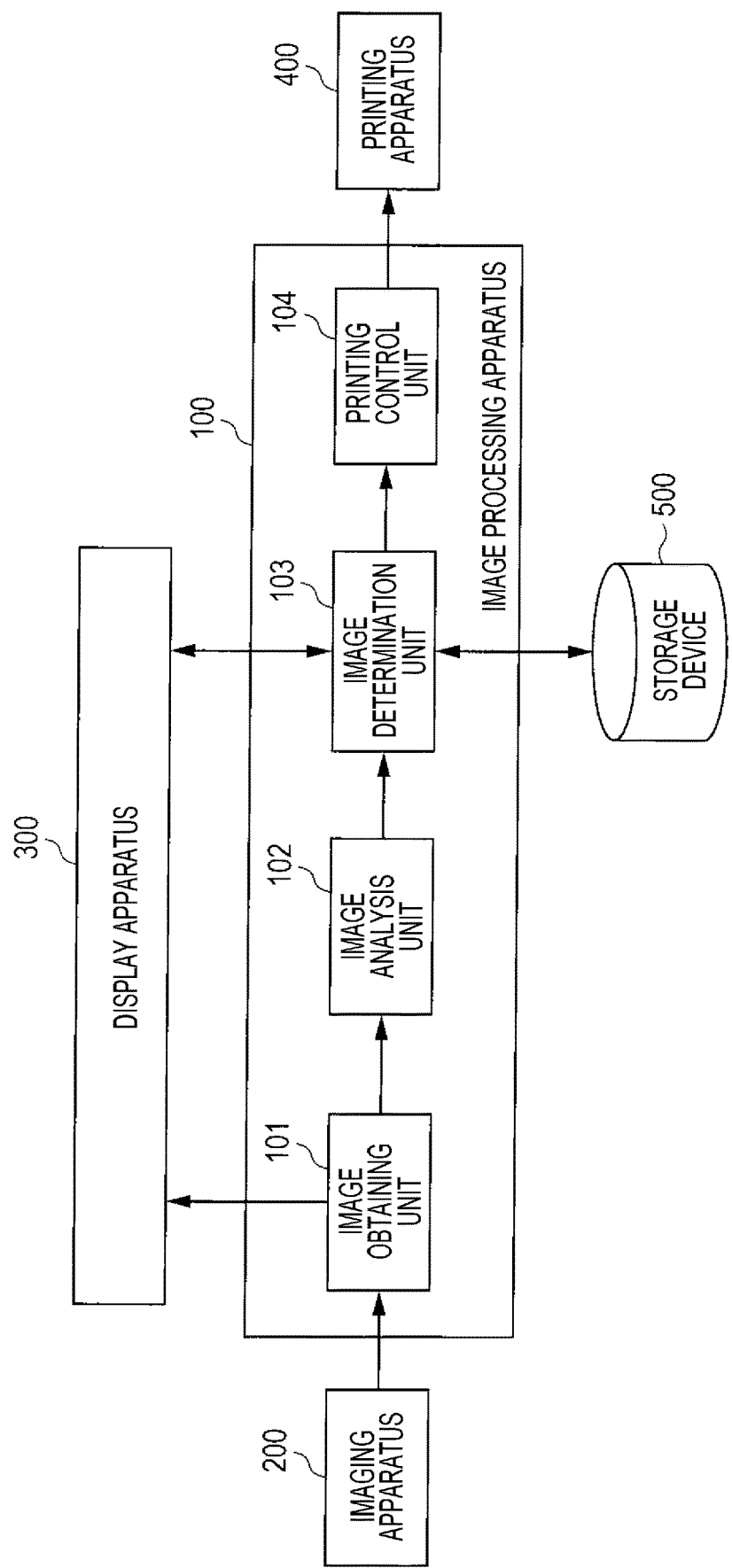
FIG. 3 is a block diagram illustrating an example of an image processing apparatus according to the present disclosure.

Although the image processing apparatus 100 includes the imaging apparatus 200 and the display apparatus 300 as an example in FIG. 1, the imaging apparatus 200 and the display apparatus 300 may be provided outside the image processing apparatus 100, instead, as illustrated in FIG. 3, which will be referred to later.

The imaging apparatus 200 obtains a face image 601 by capturing a face of a user 600 located in front of the display apparatus 300 with a light turned on. The face image 601 includes an image (hereinafter referred to as a "skin image") 510 of facial skin.

Although a face image is taken as an example in the present embodiment, the image processed by the image processing apparatus 100 need not necessarily be a face image. For example, the image processing apparatus 100 may process an image of the skin of the back of a hand or an arm.

The display apparatus 300 displays the face image 601 captured by the imaging apparatus 200. As illustrated in FIG. 1, for example, the display apparatus 300 displays the captured face image 601 in a laterally reversed manner. As a result, the user 600 can view her own face as if looking in a mirror.

In the present embodiment, the display apparatus 300 is a liquid crystal display with a touch panel that also serves as an operation apparatus capable of receiving various operations performed by the user. The various operations performed by the user are not limited to touch inputs to the touch panel performed with a finger or a stylus pen and include inputs achieved by pressing physical buttons (not illustrated) included in the image processing apparatus 100, speech sound, gesture, or the like.

The image processing apparatus 100 displays, on the display apparatus 300, an image (hereinafter referred to as a "makeup article image") 511 indicating a makeup article selected by the user and an image (hereinafter referred to as an "assist mark image"; an example of an assist mark part) 512 indicating an assist mark selected by the user. An assist mark is used to assist (aid) application of a sheet 540 to skin 531. As illustrated in FIG. 1, for example, the makeup article image 511 and the assist mark image 512 are superimposed upon the face image 601. The makeup article image 511 illustrated in FIG. 1 is an image of blusher (an example of a makeup article).

The image processing apparatus 100 also generates image data including contents indicating that the makeup article image 511 and the assist mark image 512 selected by the user are to be printed on the sheet 540 using certain color materials and outputs the image data to the printing apparatus 400.

Color materials are described in Japanese Unexamined Patent Application Publication No. 3-157313, Japanese Unexamined Patent Application Publication No. 9-302294, and Japanese Unexamined Patent Application Publication No. 2012-203425, for example, and detailed description thereof is omitted. A color material used to print the makeup article image 511 and a color material used to print the assist mark image 512 may be the same in terms of composition or may be different from each other. A color of the color material used to print the makeup article image 511 and a color of the color material used to print the assist mark image 512 may be the same but preferably different from each other so that the user can easily distinguish the makeup article image 511 and the assist mark image 512.

The printing apparatus 400 prints the makeup article image 511 and the assist mark image 512 using color materials of certain colors on the basis of image data received from the image processing apparatus 100 and outputs the sheet 540. The sheet 540 may be called a "sheet-shaped cosmetic article".

Figure 2A:
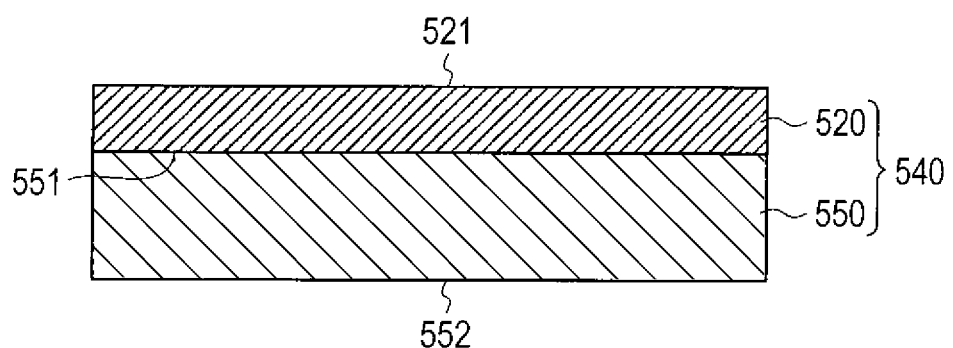
FIGS. 2A and 2B are cross-sectional views illustrating examples of the configuration of a sheet according to the present disclosure.

Now, FIG. 2A illustrates an example of the configuration of the sheet 540. The sheet 540 includes a thin film 520 and a backing member 550.

As illustrated in FIG. 2A, for example, the thin film 520 is a member detachably adhered to a surface 551 of the backing member 550. The thin film 520 is 100 to 1,000 nm (nanometers) in thickness, for example, and has flexibility, elasticity, permeability, and biocompatibility. More specifically, the thin film 520 is a film having a thickness of 10 nm to 500 nm, for example, and includes a layer composed of a biocompatible polymer such as polylactic acid, polyglycolic acid, polycaprolactone, a copolymer of these materials, hyaluronic acid, or chitosan. The sheet 540 may be, for example, one described in Japanese Unexamined Patent Application Publication No. 2014-140978.

The backing member 550 is composed of a highly absorbent material such as paper, a nonwoven fabric, a porous film, or a nanofiber sheet.

For example, the printing apparatus 400 ejects the color materials of the certain colors onto a surface 521 of the thin film 520 with the thin film 520 adhered to the backing member 550 as illustrated in FIG. 2A. As a result, the makeup article image 511 and the assist mark image 512 are formed on the thin film 520.

When the assist mark image 512 is formed on the thin film 520 as described above, the backing member 550 is preferably formed of a transparent material so that the assist mark image 512 formed on the thin film 520 can be seen from a side of a surface 552 (a surface opposite the surface 551 of the backing member 550) of the backing member 550. As a result, even when the user directs the thin film 520 to the skin in order to apply the sheet 540 and the surface 552 faces the imaging apparatus 200, the imaging apparatus 200 can capture the assist mark image 512 formed on the thin film 520.

If the user 600 applies the surface 521 of the thin film 520 to the skin 531 and peels off the backing member 550 when the assist mark image 512 is formed on the thin film 520, the assist mark image 512 is left on the skin 531. Because the assist mark image 512 left on the skin 531 looks poor, a cut line for assisting the user in peeling off the assist mark image 512, for example, may be formed around the assist mark image 512. As a result, the user can peel off only the assist mark image 512 while leaving the makeup article image 511 on the skin 531.

The assist mark image 512 may be formed on the backing member 550, instead. In this case, if the user 600 applies the surface 521 of the thin film 520 to the skin 531 and peels off the backing member 550, the assist mark image 512 is also peeled off. Only the makeup article image 511, therefore, is left on the skin 531.

Figure 2B:
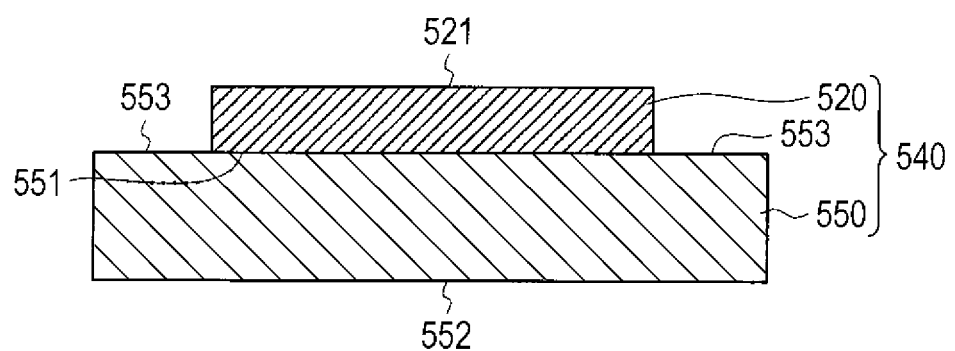

Alternatively, as illustrated in FIG. 2B, the sheet 540 may have a configuration in which the thin film 520 is not adhered to the entirety of the surface 551 of the backing member 550. In this configuration, the assist mark image 512 may be formed in parts 553 of the surface 551 that are not adhered to the thin film 520. In this case, the backing member 550 is preferably formed of a transparent material so that the assist mark image 512 formed in the parts 553 can be seen from the side of the surface 552.

Alternatively, the sheet 540 need not include the backing member 550 (e.g., includes only the thin film 520).

Alternatively, the sheet 540 may also include a second backing member (not illustrated) different from the backing member 550. The second backing member is composed of a plastic, for example, and adhered to the surface 552 of the backing member 550. The area of the second backing member adhered to the backing member 550 may be the same as that of the surface 552 of the backing member 550 but is preferably larger than that of the surface 552 of the backing member 550. In addition, the assist mark image 512 may be formed on the second backing member. By providing the second backing member, the sheet 540 becomes more rigid, and the user can easily handle the sheet 540.

After the printing apparatus 400 outputs the sheet 540, the user 600 takes the sheet 540 and applies the sheet 540 to the skin 531. For example, the user moves the sheet 540 in such a way as to match an assist mark image 512 superimposed upon the face image 601 and an assist mark image 512 on the sheet 540 captured by the imaging apparatus 200 while checking positions of the assist mark images 512 on the display apparatus 300, details of which will be described later. If the two positions match, the user peels off the backing member 550 with the surface 521 of the thin film 520 adhered to the skin 531. As a result, as illustrated in FIG. 1, the makeup article image 511 formed on the sheet 540 (thin film 520) is attached to the skin 531.

The makeup assist system 1 thus achieves easy makeup through a simple and brief process for applying the sheet 540 on which the makeup article image 511 is printed to the skin 531. In addition, when the sheet 540 is applied to the skin 531, the makeup article image 511 can be positioned using the assist mark image 512, and the makeup article image 511 can be disposed on the skin 531 at an appropriate position.

Apparatus Configuration

Next, the configuration of the image processing apparatus 100 will be described with reference to FIG. 3.

FIG. 3 is a block diagram illustrating an example of the configuration of the image processing apparatus 100.

The image processing apparatus 100 illustrated in FIG. 3 may be a stationary apparatus or a portable apparatus that can be moved easily.

The storage device 500 illustrated in FIG. 3 is included in a server apparatus (not illustrated) in a network, for example, and stores various pieces of information. For example, the storage device 500 stores a makeup article image table (refer to FIG. 5) and an assist mark image table (refer to FIG. 6), which will be described later. The storage device 500 also stores, for example, analysis result information, assist mark information, and the like, which will be described later, for each user (user identification information). The storage device 500 may be included in the image processing apparatus 100, instead.

In FIG. 3, the image processing apparatus 100 includes an image obtaining unit 101, an image analysis unit 102, an image determination unit 103, and a printing control unit 104. Although not illustrated, the image processing apparatus 100 includes, for example, a central processing unit (CPU), a storage medium such as a read-only memory (ROM) storing control programs, a working memory such as a random-access memory (RAM), and a communication circuit. In this case, functions of the components illustrated in FIG. 3 are achieved by executing the control programs using the CPU.

The image obtaining unit 101 obtains a face image of the user from the imaging apparatus 200 and displays the face image on the display apparatus 300. The face image may be a moving image or a still image.

The image obtaining unit 101 outputs the face image obtained from the imaging apparatus 200 to the image analysis unit 102.

Upon receiving the face image from the image obtaining unit 101, the image analysis unit 102 extracts facial feature points from the face image and then extracts facial components (e.g., the eyes, eyelids, cheeks, nose, lips, forehead, jaw, etc.) on the basis of the extracted feature points.

Figure 4:
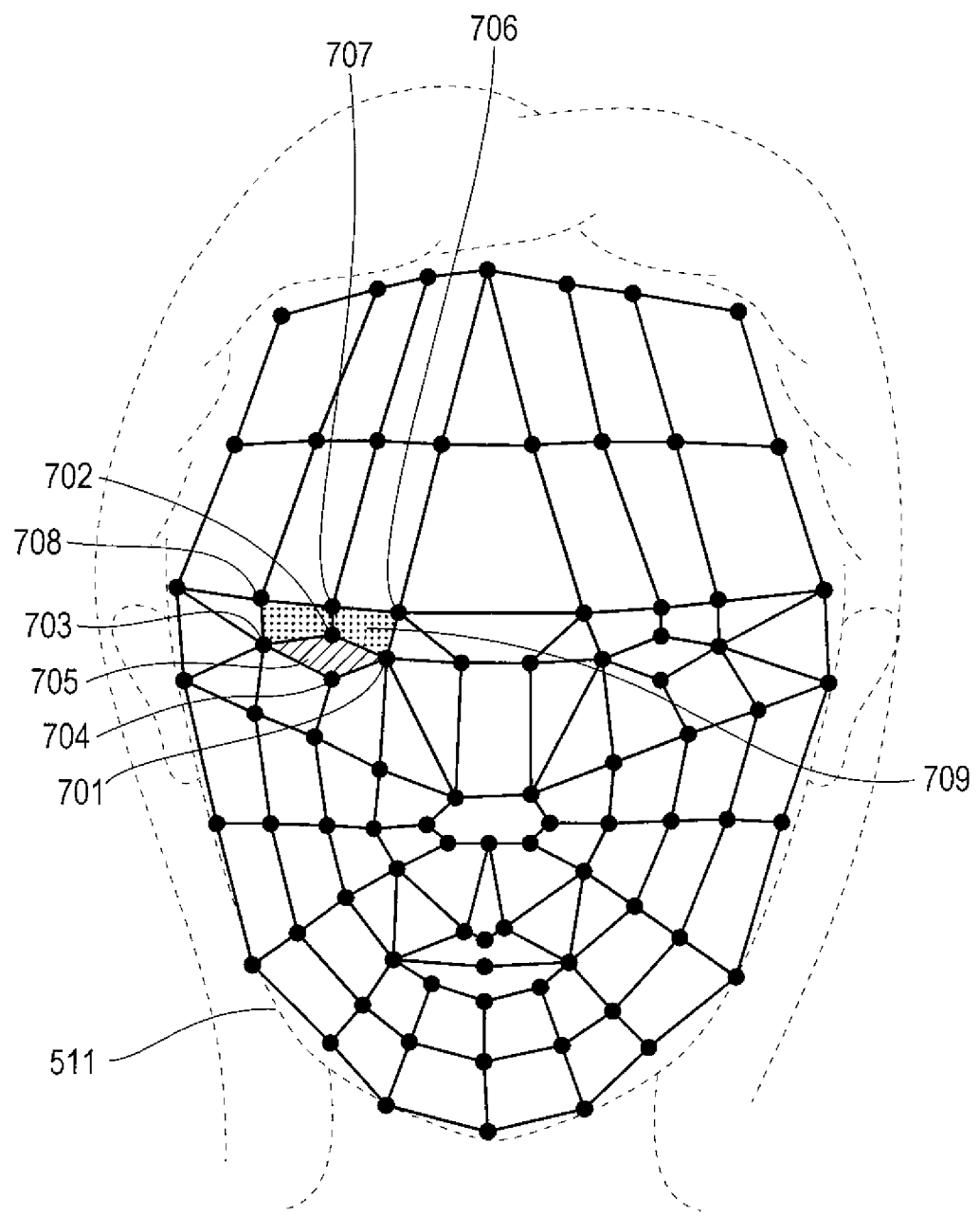
FIG. 4 is a diagram illustrating an example of facial feature points according to the present disclosure.

As illustrated in FIG. 4, for example, a plurality of facial feature points (indicated by a symbol "•") are extracted from the face image. For example, facial feature points 701 to 704 constitute a right eye. The image analysis unit 102, therefore, extracts an area 705 defined by the facial feature points 701 to 704 as a right eye (an example of the facial component). Facial feature points 701 to 703 and 706 to 708, for example, constitute a right eyelid. The image analysis unit 102, therefore, extracts an area 709 defined by the facial feature points 701 to 703 and 706 to 708 as a right eyelid (an example of the facial component).

Coordinates of each facial feature point, for example, are ones in a facial coordinate system set in accordance with a plurality of facial feature points. Alternatively, coordinates of each facial feature point may be ones for which a feature point and coordinates are newly defined from a plurality of arbitrary facial feature points. The coordinates may be two-dimensional coordinates or three-dimensional coordinates.

The image analysis unit 102 outputs analysis result information indicating a result of analysis of a face image to the image determination unit 103. The analysis result information includes, for example, information regarding types of facial components extracted, coordinates of facial feature points with which the facial components can be identified, and the like.

Upon receiving the analysis result information from the image analysis unit 102, the image determination unit 103 stores the analysis result information and the user identification information in the storage device 500 while associating the analysis result information with user identification information.

The image determination unit 103 then reads the makeup article image table from the storage device 500 and displays various makeup article images on the display apparatus 300 on the basis of the makeup article image table.

An example of the makeup article image table will be described hereinafter. FIG. 5 is a diagram illustrating an example of the makeup article table.

As illustrated in FIG. 5, a plurality of makeup article images are registered in the makeup article table for each type of makeup article (eyeshadow, blusher, concealer, lipstick, highlighter, etc.). The makeup article images are colored (i.e., printing colors of the makeup article images are set). In FIG. 5, character strings including alphabets and numbers are identification information regarding the makeup article images.

A target position (hereinafter referred to as a "makeup article target position") on the face relative to the facial feature points is set for each makeup article image. The makeup article target position is a position on the skin of the face at which a corresponding makeup article is to be disposed.

The makeup article target position (e.g., an area 709) is set for an image of eyeshadow to be disposed on the right eyelid (hereinafter referred to as a "right eyeshadow image"), for example, in accordance with the facial feature points 701 to 703 illustrated in FIG. 4.

The image determination unit 103 may display all the makeup article images illustrated in FIG. 5 as a list, for example, or may display types of makeup article images specified by the user as a list. The user performs an operation (an operation for selecting a makeup article image) for selecting a desired makeup article image from the plurality of makeup article images displayed as a list.

After the user selects a makeup article image, the image determination unit 103 superimposes the selected makeup article image upon a face image on the basis of coordinates of facial feature points included in analysis result information and a makeup article target position of the selected makeup article image (refer to FIG. 1). If the user desires to print the superimposed makeup article image on a sheet, the user performs an operation (an operation for determining a makeup article images) for determining the makeup article image as an image to be printed on the sheet.

If the user performs the operation for determining a makeup article image, the image determination unit 103 determines the superimposed makeup article image as a print image (an image to be printed on a sheet).

The image determination unit 103 then reads the assist mark image table from the storage device 500 and displays various assist mark images on the display apparatus 300 on the basis of the assist mark image table.

Now, an example of the assist mark image table will be described. FIG. 6 is a diagram illustrating an example of the assist mark image table.

As illustrated in FIG. 6, a plurality of types of assist mark images (a surrounding mark, a one-point mark, a two-point mark, a three-point mark, a cross mark, a line mark, etc.) are registered in the assist mark image table for each makeup article image. The assist mark images are colored (i.e., printing colors of the assist mark images are set). Although not illustrated, identification regarding each assist mark image may be associated with the assist mark image.

Shapes of the assist mark images are not limited to those illustrated in FIG. 6. For example, characters such as numbers or alphabets may be used for one-point mark images, two-point mark images, three-point mark images, and cross mark images illustrated in FIG. 6, instead of points or crosses. Although points included in the two-point mark images and the three-point mark images have the same shape (e.g., a perfect circle) in the example illustrated in FIG. 6, at least one point may have another shape (e.g., a triangle etc.), instead. The larger the number of points, the easier the positioning of an assist mark image (makeup article image) performed by the user during an operation for assisting application, which will be described later. Although surrounding mark images are indicated by broken lines in the example illustrated in FIG. 6, the surrounding mark images may be indicated by solid lines, instead. Although line mark images are indicated by solid lines in the example illustrated in FIG. 6, the line mark images may be indicated by broken lines, instead.

A target position (hereinafter referred to as an "assist mark target position") on the face according to facial feature points is set for each assist mark image. An assist mark target position is a position in the face at which an assist mark is to be disposed.

If the makeup article target position of the right eyeshadow image is set in accordance with the facial feature points 701 to 703 illustrated in FIG. 4, for example, an assist mark target position (e.g., one of the facial feature points 706 to 708) is set for the assist mark image of the one-point mark associated with the right eyeshadow image in accordance with the facial feature points 701 to 703 illustrated in FIG. 4. That is, facial feature points that serve as references for an assist mark target position and facial feature points that serve as references for a makeup article target position are the same (common). That is, it can be said that a position of an assist mark image is set in relation to a makeup article image.

The image determination unit 103 displays, for example, all assist mark images (a surrounding mark, a one-point mark, a two-point mark, a three-point mark, a cross mark, a line mark, etc.) associated with a determined makeup article image as a list. The user performs an operation for selecting a desired assist mark image from the plurality of assist mark images displayed as a list (an operation for selecting an assist mark image).

Assist mark images may be displayed as a list on the basis of priority levels set for the assist mark images, instead. In FIG. 6, values displayed beside the assist mark images indicate priority levels of the assist mark images. The priority levels represent handiness for the user in values, and larger values indicate higher degrees of handiness (higher priority levels) for the user. The priority levels are set, for example, by a cosmetics maker or the like in advance.

If a determined makeup article image is an image of eyeshadow illustrated in FIG. 6, for example, assist mark images may be displayed as a list in descending order of the priority level. In this display mode, for example, an assist mark image whose priority level is the highest may be displayed largest, and an assist mark image whose priority level is the lowest may be displayed smallest. Alternatively, the assist mark image whose priority level is the highest may be displayed at a top, and the assist mark image whose priority level is the lowest may be displayed at a bottom.

Alternatively, only the assist mark image whose priority level is the highest may be displayed as a recommended assist mark image, instead of displaying a list. If the user does not select the assist mark image, an assist mark image whose priority level is the second highest may be displayed.

If the user selects an assist mark image, the image determination unit 103 superimposes the selected assist mark image upon a face image on the basis of coordinates of facial feature points included in analysis result information and an assist mark target position of the selected assist mark image (refer to FIG. 1). If the user desires to print the superimposed assist mark image on a sheet, the user performs an operation for determining the assist mark image as an image to be printed on a sheet (an operation for determining an assist mark image).

If the operation for determining the assist mark image is performed, the image determination unit 103 determines the superimposed assist mark image as a print image.

The image determination unit 103 then outputs the determined makeup article image and assist mark image to the printing control unit 104. The image determination unit 103 stores the determined assist mark image and assist mark information indicating the assist mark target position of the assist mark image in the storage device 500 while associating the assist mark image and the assist mark information with user identification information. The assist mark information is used by an image processing apparatus 110 (refer to FIG. 8) during the operation for assisting application of a sheet, which will be described later.

The printing control unit 104 generates image data (e.g., data of a cyan, magenta, yellow, black (CMYK) format) used to print the images on a sheet on the basis of the makeup article image and the assist mark image received from the image determination unit 103 and outputs the image data to the printing apparatus 400 through wireless communication, wired communication, and/or the like.

The image data includes contents indicating that the makeup article image is to be printed on a sheet (e.g., the thin film 520) using a color material of a certain color. The image data also includes contents indicating that the assist mark image is to be printed on the sheet (e.g., the thin film 520 or the backing member 550) using a color material of a certain color. The image data further includes contents indicating that the assist mark image is to be printed at a position corresponding to a printing position of the makeup article image (on the basis of a relative positional relationship with the makeup article image).

The printing control unit 104 need not necessarily transmit the generated image data to the printing apparatus 400 directly and may indirectly transmit the generated image data to the printing apparatus 400 through another information recording device or the like, instead. For example, the printing control unit 104 may record the generated image data in a recording medium such as a portable memory device or transmit the generated image data to a portable device (a smartphone, a tablet, a personal computer (PC), etc.). In this case, the user transmits the image data to the printing apparatus 400 through the recording medium or the portable device, and the printing apparatus 400 performs necessary printing in accordance with an instruction from the user or the like.

Apparatus Operation

Next, the operation of the image processing apparatus 100 (an operation for generating image data) will be described.

Figure 7:
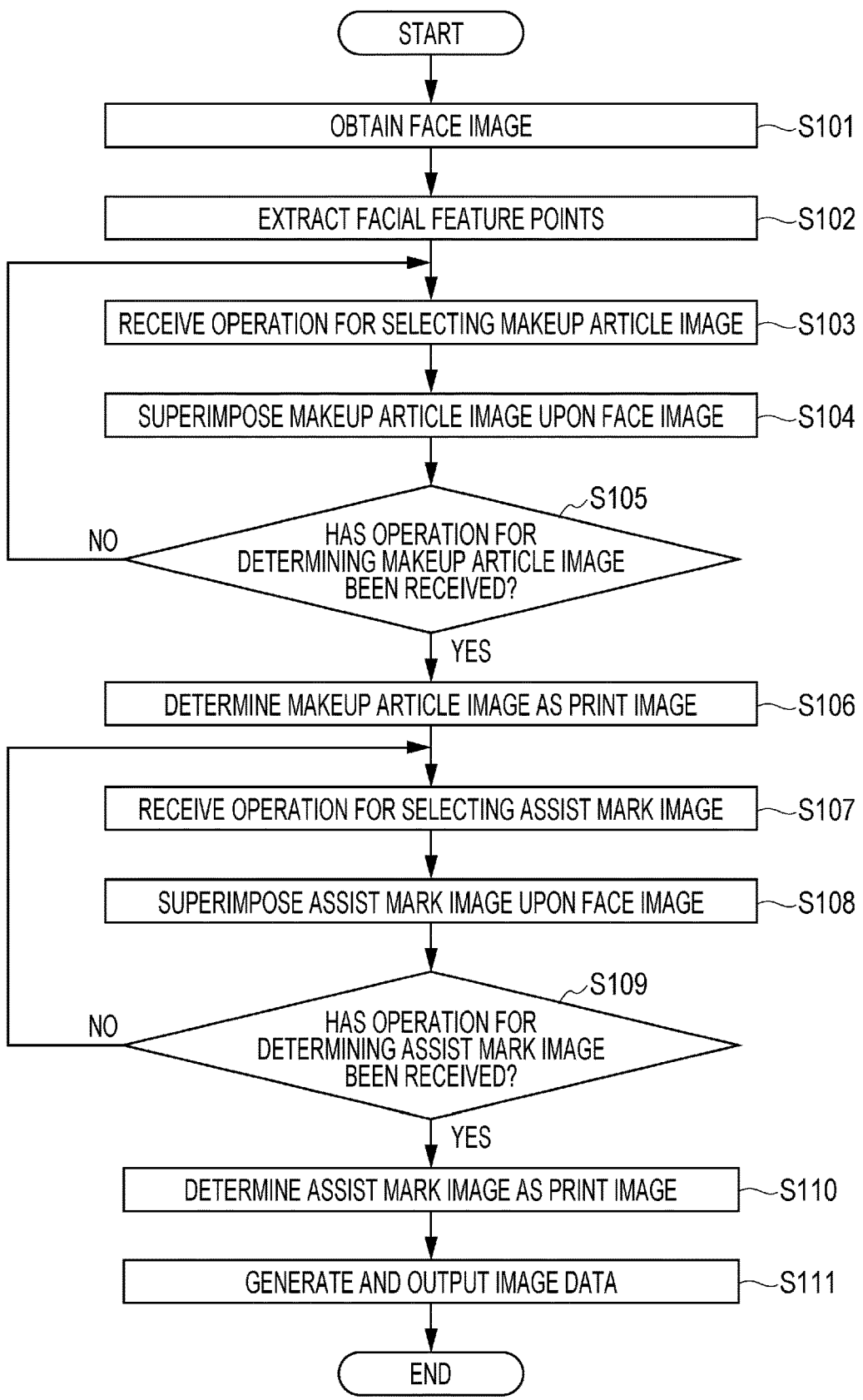
FIG. 7 is a flowchart illustrating an example of a printing operation performed by the image processing apparatus according to the present disclosure.

FIG. 7 is a flowchart illustrating an example of the operation of the image processing apparatus 100.

In step S101, the image obtaining unit 101 obtains a face image of the user from the imaging apparatus 200 and outputs the face image to the image analysis unit 102. The image obtaining unit 101 displays the face image on the display apparatus 300.

In step S102, upon receiving the face image from the image obtaining unit 101, the image analysis unit 102 extracts facial feature points from the face image. The image analysis unit 102 extracts facial components (e.g., the eyes, eyelids, cheeks, nose, lips, forehead, jaw, etc.) on the basis of the extracted feature points.

The image analysis unit 102 then outputs, to the image determination unit 103, the extracted facial components and analysis result information indicating coordinates of facial feature points with which the facial components can be identified. The image determination unit 103 stores the analysis result information received from the image analysis unit 102 and user identification information in the storage device 500 while associating the analysis result information and the user identification information with each other.

In step S103, the image determination unit 103 displays various makeup article images on the display apparatus 300 on the basis of the makeup article image table (refer to FIG. 5) read from the storage device 500 and receives an operation for selecting a makeup article image performed by the user.

In step S104, the image determination unit 103 superimposes the makeup article image selected by the user upon the face image on the basis of the analysis result information received from the image analysis unit 102 and a makeup article target position of the makeup article image selected by the user.

In step S105, the image determination unit 103 determines whether an operation for determining a makeup article image performed by the user has been received. If an operation for determining a makeup article image is not received (NO in step S105), the flow returns to step S103. If an operation for determining a makeup article image is received (YES in step S105), on the other hand, the flow proceeds to step S106.

In step S106, the image determination unit 103 determines the makeup article image superimposed upon the face image as a print image.

In step S107, the image determination unit 103 displays various assist mark images on the display apparatus 300 on the basis of the assist mark image table (refer to FIG. 6) read from the storage device 500 and receives an operation for selecting an assist mark image performed by the user.

In step S108, the image determination unit 103 superimposes an assist mark image selected by the user upon the face image on the basis of the analysis result information received from the image analysis unit 102 and an assist mark target position of the assist mark image selected by the user.

In step S109, the image determination unit 103 determines whether the operation for determining an assist mark image performed by the user has been received. If the operation for determining an assist mark image is not received (NO in step S109), the flow returns to step S107. If an operation for determining an assist mark image is received (YES in step S109), on the other hand, the flow proceeds to step S110.

In step S110, the image determination unit 103 determines the assist mark image superimposed upon the face image as a print image. The image determination unit 103 then outputs the determined makeup article image and assist mark image to the printing control unit 104. The image determination unit 103 stores the determined assist mark image and assist mark information indicating the assist mark target position of the assist mark image in the storage device 500.

In step S111, the printing control unit 104 generates image data on the basis of the makeup article image and the assist mark image received from the image determination unit 103 and outputs the image data to the printing apparatus 400. The image data includes contents indicating that the makeup article image is to be printed on a sheet (e.g., a thin film) using a color material of a certain color and that the assist mark image is to be printed on the sheet (e.g., the thin film or a backing member) at a position corresponding to a printing position of the makeup article image using a color material of a certain color.

The image data may include various pieces of information regarding the printing. A specific example of the various pieces of information will be described hereinafter.

The image data may include, for example, contents indicating a shape of the sheet, a shape and a size of the makeup article image to be printed on the sheet, a shape and a size of the assist mark image to be printed on the sheet, whether the assist mark image is to be printed on the thin film or the backing member, and the like.

The image data may also include, for example, contents indicating types of color materials, the density of the color materials, presence or absence of shading (presence or absence of gradation) at a periphery of the makeup article image, and the like.

The image data may also include, for example, contents indicating types of facial components corresponding to makeup article images and the like. As a result, a makeup article image is printed on a sheet for each facial component, and the user can easily identify a facial component corresponding to a makeup article image.

The image data may also include, for example, sheet identification information (e.g., numbers) to be printed on sheets. As a result, if a plurality of sheets are output, for example, consecutive numbers are printed on the plurality of sheets. The numbers correspond to positions at which the sheets are to be applied (e.g., facial components, makeup article target positions, assist mark target positions, etc.). The user can determine a position at which a sheet is to be applied by checking a number printed on the sheet (or a number on a sheet image included in a captured image).

For example, the sheet identification information may be barcodes, instead. The barcodes may include information regarding types of makeup article images, as well as the positions at which the sheets are to be applied. A barcode is read by the imaging apparatus 200 during the operation for assisting application of a sheet, which will be described later. The image processing apparatus 110, which will be described later, may then receive various pieces of information included in the barcode from the imaging apparatus 200, identify a type of makeup article image, a position at which a sheet is to be applied, and the like on the basis of the various pieces of information, and assist the user in applying the sheet by displaying an image and/or outputting a sound (e.g., includes various notifications that will be described later).

The image data may also include, for example, contents indicating a position, a shape, and a size of a holding area, which is an area of the sheet to be held by the user by hand. As a result, the holding area is printed on the sheet, and the user can identify a part of the sheet to be held.

The image data may also include, for example, contents indicating a position, a shape, and a size of a mark for identifying a direction of the sheet for the user. As a result, the mark is printed on the sheet (e.g., a triangle indicating an upward direction is printed at a top of the sheet), and the user can identify the direction of the sheet.

The image data may also include, for example, contents indicating a guiding line along which the user can manually cut the sheet into a certain size, scanning information regarding an automatic cutting device necessary when the automatic cutting device is used to cut the sheet into a certain size, or the like.

The image data may also include, for example, contents indicating a type of medicine (active constituent), the concentration of the medicine, and the like. The medicine corresponds to a type of factor (hereinafter referred to as a "factor type") in discoloration in a discolored area and facilitates improvement in the discolored area. The medicine may be, for example, an anti-inflammatory agent, a skin whiter, an ultraviolet (UV) absorber, an UV reflector, a hydroquinone medicine, or the like.

The discolored area can be, depending on the factor type, a pigment macule, a liver spot, a nevus spilus, a pigment cell nevus, an Ota nevus, acquired dermal melanocytosis, erythema, purpura, vitiligo, a bruise, a mole, discoloration at pores, a tanned area, acne (pimples), an acne spot, pigmentation due to rubbing or inflammation, wrinkles, ephelides (freckles), a tattoo, a wart, a cicatrix, or the like. A measure (e.g., a medicine) to be taken for the discolored area differs depending on the factor type.

If a plurality of makeup article images and a plurality of assist mark images corresponding to the plurality of makeup article images are determined, for example, the image data may include contents indicating whether each set of images (a makeup article image and a corresponding assist mark image) is to be printed on a sheet or a plurality of sets of images are to be collectively printed on a sheet.

An example of the information included in the image data has been described.

After step S111, the printing apparatus 400 prints the makeup article image on the sheet (e.g., a thin film) using the color material of the certain color on the basis of the image data received from the image processing apparatus 100. The printing apparatus 400 also prints the assist mark image on the sheet (e.g., the thin film or the backing member) using the color material of the certain color on the basis of the image data received from the image processing apparatus 100. At this time, the printing apparatus 400 prints the assist mark image at a position corresponding to a printing position of the makeup article image. That is, the makeup article image and the assist mark image are printed on the basis of predetermined relative positions.

The printing apparatus 400 then outputs the sheet on which the makeup article image and the assist mark image have been printed.

The user holds the sheet output from the printing apparatus 400 by hand and applies the sheet to the skin. In the present embodiment, the image processing apparatus 110, which will be described hereinafter, assists the user in applying the sheet.

The image processing apparatus 110 that performs the operation for assisting application of a sheet will be described hereinafter.

Apparatus Configuration

Next, the configuration of the image processing apparatus 110 will be described with reference to FIG. 8.

Figure 8:
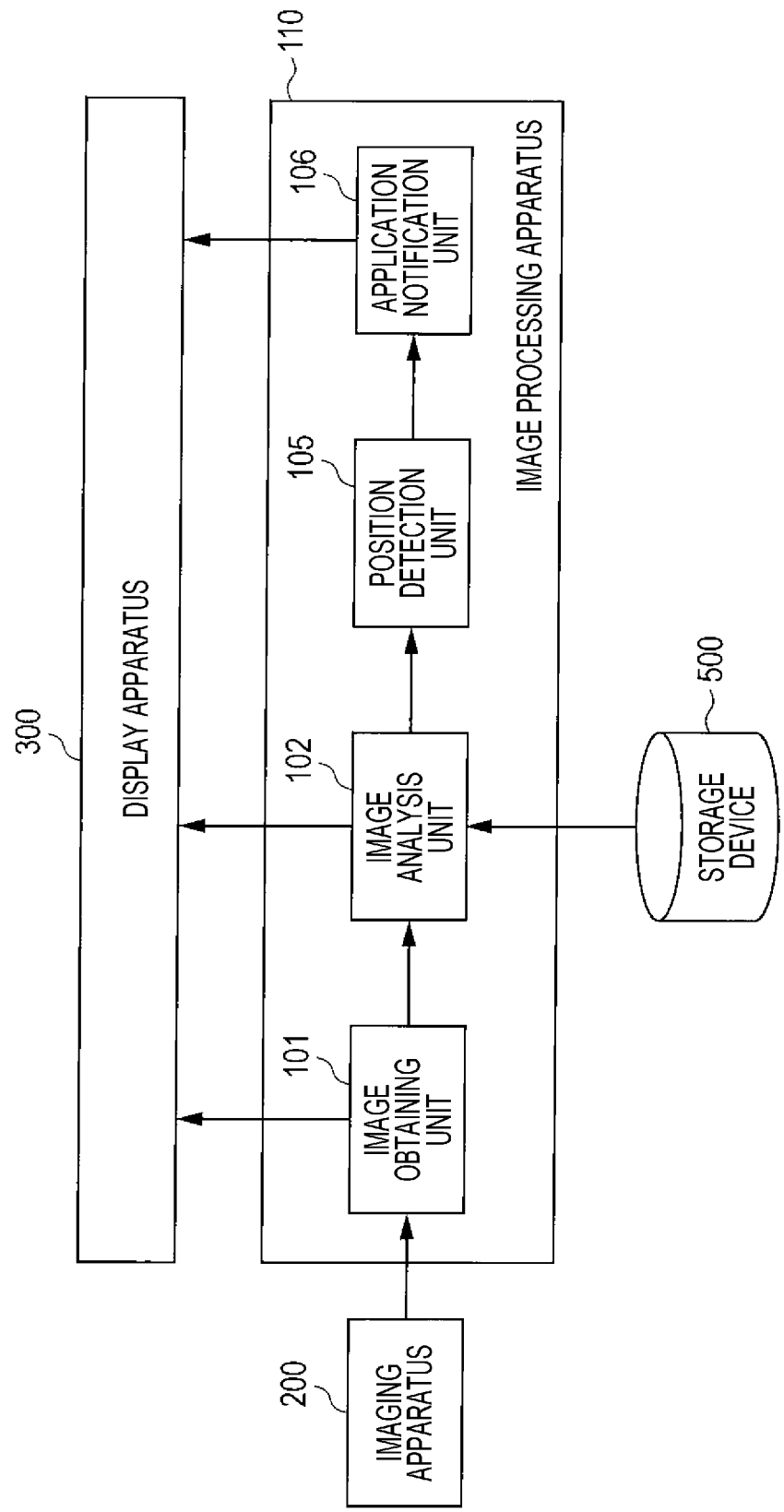
FIG. 8 is a block diagram illustrating an example of the image processing apparatus according to the present disclosure.

FIG. 8 is a block diagram illustrating an example of the configuration of the image processing apparatus 110. The imaging apparatus 200, the display apparatus 300, and the storage device 500 illustrated in FIG. 8 are those described with reference to FIGS. 1 and 3, and detailed description thereof is omitted here.

As illustrated in FIG. 8, the image processing apparatus 110 includes the image obtaining unit 101, the image analysis unit 102, a position detection unit 105, and an application notification unit 106.

The image obtaining unit 101 obtains an image captured by the imaging apparatus 200 (hereinafter referred to as a "captured image") and displays the captured image on the display apparatus 300. The captured image includes a face image of the user and an image of a sheet held by the user by hand (hereinafter referred to as a "sheet image"). The captured image is, for example, a moving image.

The image obtaining unit 101 outputs the captured image obtained from the imaging apparatus 200 to the image analysis unit 102.

Upon receiving the captured image from the image obtaining unit 101, the image analysis unit 102 extracts facial feature points from the face image (refer to FIG. 4) and then extracts facial components (e.g., the eyes, eyelids, cheeks, nose, lips, forehead, jaw, etc.) on the basis of the extracted feature points.

If the captured image does not include a sheet image, or if the captured image includes a sheet image but an assist mark image is not detected (identified) in the sheet image, the image analysis unit 102 may display, on the display apparatus 300, a screen for asking the user whether to end the operation for assisting application of a sheet.

The image analysis unit 102 also obtains assist mark information from the storage device 500. As described above, for example, the assist mark information is information indicating an assist mark image determined by the image processing apparatus 100 and an assist mark target position of the assist mark image.

The image analysis unit 102 then superimposes the assist mark image upon the face image on the basis of the extracted facial feature points and the assist mark target position. As a result, the assist mark image is displayed in the face image displayed on the display apparatus 300 at the assist mark target position. The assist mark image superimposed upon the face image will be referred to as a "target position image" hereinafter.

Figure 9:
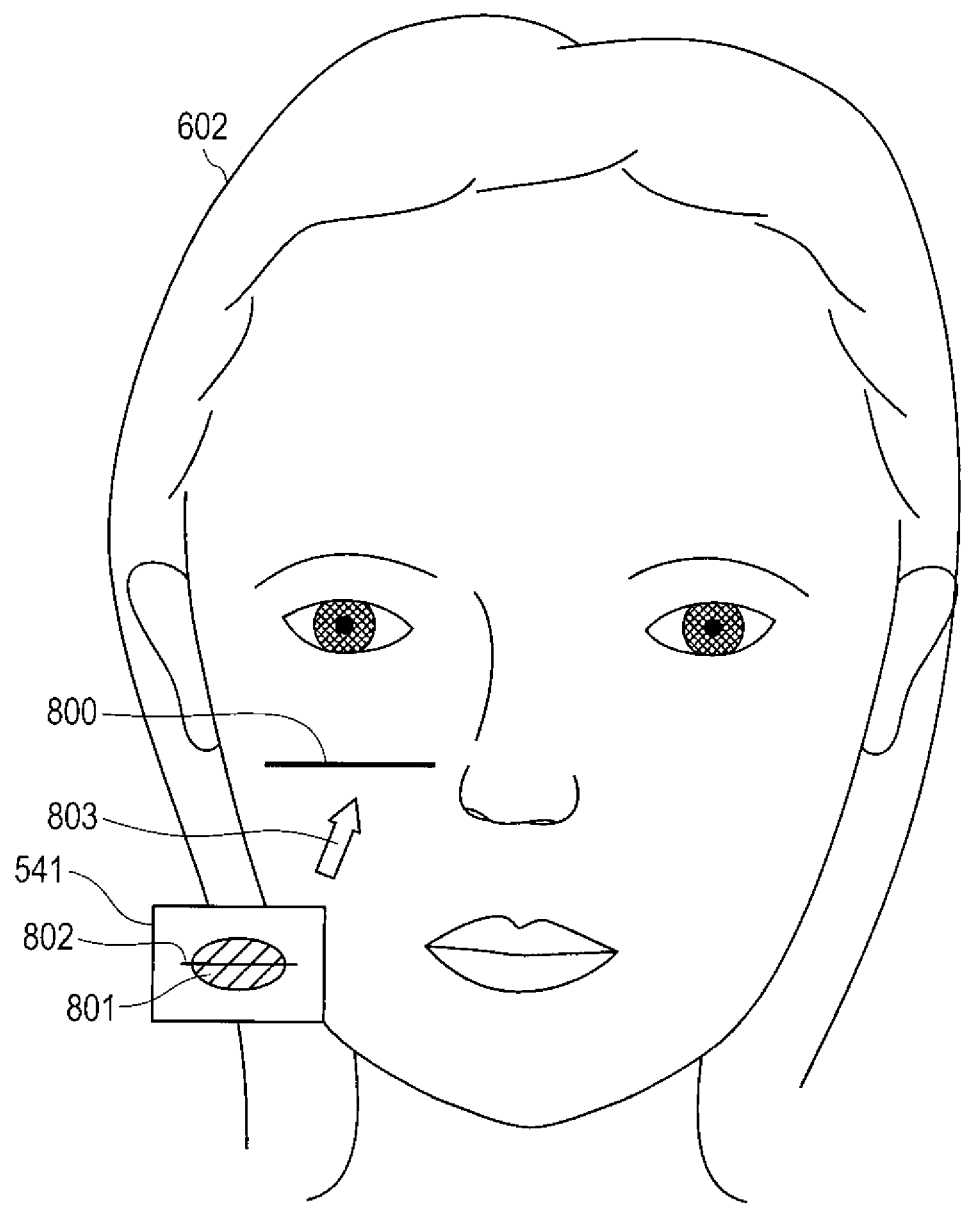
FIG. 9 is a diagram illustrating an example of an image displayed during an operation for assisting application in the present disclosure.

An example of a target position image displayed on the display apparatus 300 will be described with reference to FIG. 9. FIG. 9 illustrates an example of a captured image displayed on the display apparatus 300. It is assumed here that the user directs a side of a thin film of a sheet to the skin and a side of a backing member of the sheet to the imaging apparatus 200.

As illustrated in FIG. 9, a face image 602 of the user who is applying the sheet and a sheet image 541 of the sheet held by the user by hand (the hand is not illustrated) are displayed.

A makeup article image 801 (e.g., a blusher image) and an assist mark image 802 (e.g., a line mark image) are displayed on the sheet image 541. As described above, the makeup article image 801 and the assist mark image 802 can be captured since the backing member is formed of a transparent material, and the makeup article image 801 and the assist mark image 802 are displayed on the display apparatus 300. It is sufficient that at least the assist mark image 802 is displayed on the display apparatus 300, and the makeup article image 801 need not necessarily be displayed.

A target position image 800 having the same shape and size as the assist mark image 802 is displayed on the face image 602. A position at which the target position image 800 is displayed is a predetermined assist mark target position.

The user applies the sheet to the skin such that the target position image 800 and the target position image 802 match while viewing the images illustrated in FIG. 9.

An example of the displayed target position image has been described. FIG. 8 is referred to again.

The image analysis unit 102 outputs the captured image and the assist mark information to the position detection unit 105.

Upon receiving the captured image and the assist mark information from the image analysis unit 102, the position detection unit 105 detects a position of the assist mark image included in the sheet image (the assist mark image printed on the sheet).

The position detection unit 105 then calculates a distance between the detected position of the assist mark image and the assist mark target position (i.e., a position of the target position image) indicated by the assist mark information. The distance calculated here will be referred to as a "calculated distance" hereinafter. A plurality of calculated distances may be obtained as follows.

If the target position image 802 and the target position image 800 are line marks as illustrated in FIG. 9, for example, the position detection unit 105 calculates a distance (an example of a first calculated distance) between a feature point corresponding to a right end of the target position image 802 and a feature point corresponding to a right end of the target position image 800. The position detection unit 105 then calculates a distance (an example of a second calculated distance) between a feature point corresponding to a left end of the target position image 802 and a feature point corresponding to a left end of the target position image 800.

If the assist mark image in the sheet image and the target position image are surrounding marks illustrated in FIG. 6, for example, the position detection unit 105 calculates a distance (an example of the first calculated distance) between a feature point corresponding to a point of the center of gravity of the assist mark image in the sheet image and a point of the center of gravity of the target position image. The position detection unit 105 also calculates a distance (an example of the second calculated distance) between a feature point corresponding to at least one point on a circumference of the assist mark image in the sheet image and a feature point corresponding to at least one point on a circumference of the target position image.

The position detection unit 105 then determines whether the calculated distance is equal to or smaller than a predetermined certain value. If a plurality of calculated distances (e.g., the first and second calculated distances) have been obtained as described above, the position detection unit 105 may determine whether the first calculated distance is equal to or smaller than a first certain value and whether the second calculated distance is equal to or smaller than a second certain value. In this case, the first and second certain values may be the same or different from each other.

If the calculated distance is equal to or smaller than the certain value, the position detection unit 105 outputs first detection result information, which indicates that it is time for the user to apply the sheet, to the application notification unit 106. A case where the calculated distance is equal to or smaller than the certain value may be a case where the detected position of the assist mark image and the assist mark target position match and the calculated distance is zero.

If the calculated distance is not equal to or smaller than the certain value, on the other hand, the position detection unit 105 outputs second detection result information, which indicates that it is not time for the user to apply the sheet, to the application notification unit 106.

If the application notification unit 106 receives the first detection result information from the position detection unit 105, the application notification unit 106 issues a notification for prompting the user to apply the sheet. For example, the application notification unit 106 displays, on the display apparatus 300, a message for prompting the user to apply the sheet. A display example is illustrated in FIG. 10.

Figure 10:
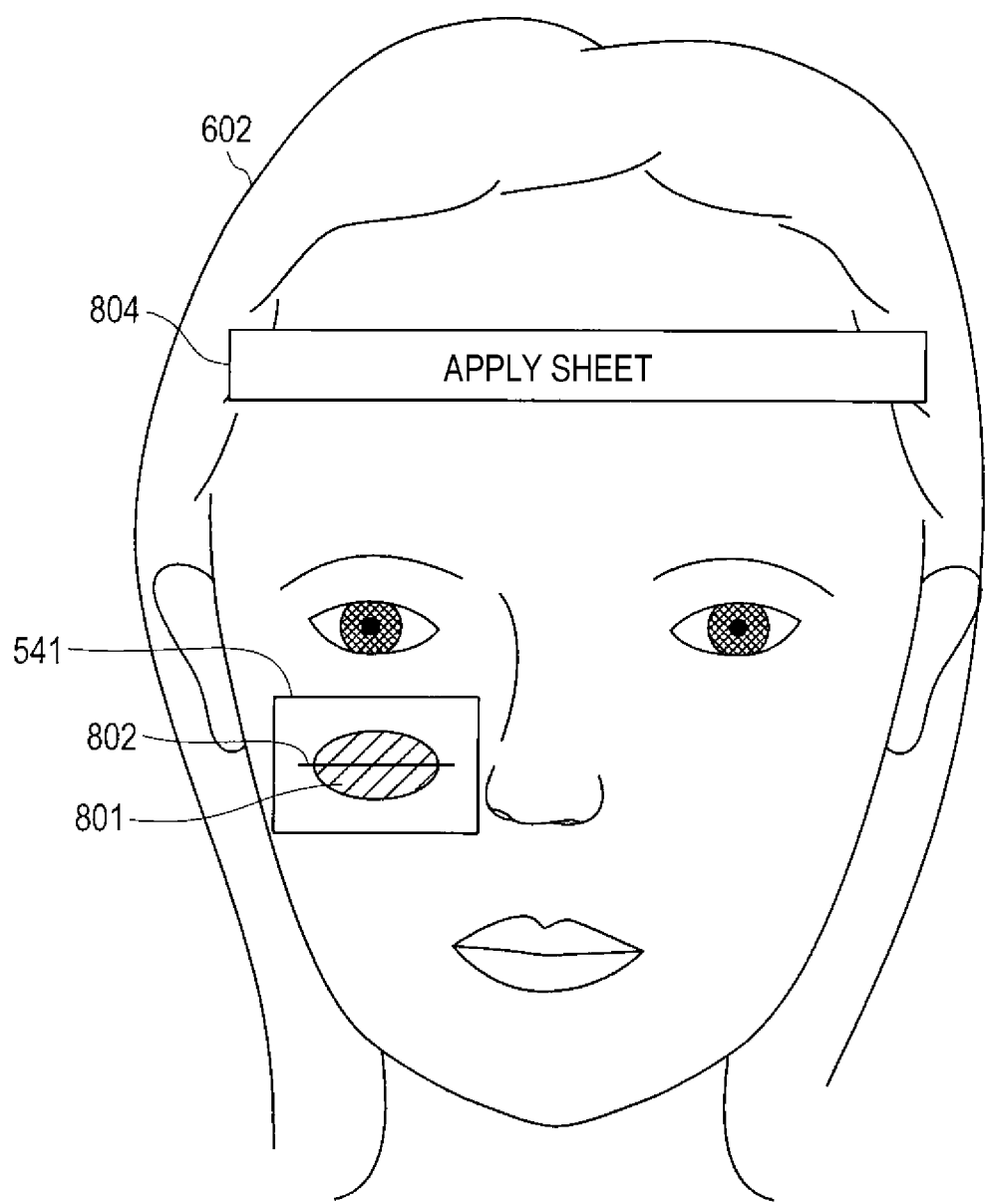
FIG. 10 is a diagram illustrating an example of the image displayed during the operation for assisting application in the present disclosure.

FIG. 10 is a diagram illustrating an example of a captured image displayed on the display apparatus 300 at a time when, for example, the user has moved the sheet such that the position of the target position image 802 matches the target position image 800 (not illustrated). As illustrated in FIG. 10, a message image 804 for prompting the user to apply the sheet is displayed on the face image 602. As a result, the user can understand that the sheet is at an appropriate position and it is time to apply the sheet.

Alternatively, a color, luminance, or the like of the target position image 802 may be changed or the target position image 802 may flash instead of, or in addition to, the message image 804. If a guide image, which will be described later, has been displayed, a color, luminance, or the like of the guide image (e.g., an arrow image 803 illustrated in FIG. 9) may be changed or the guide image may flash.

Figure 11:
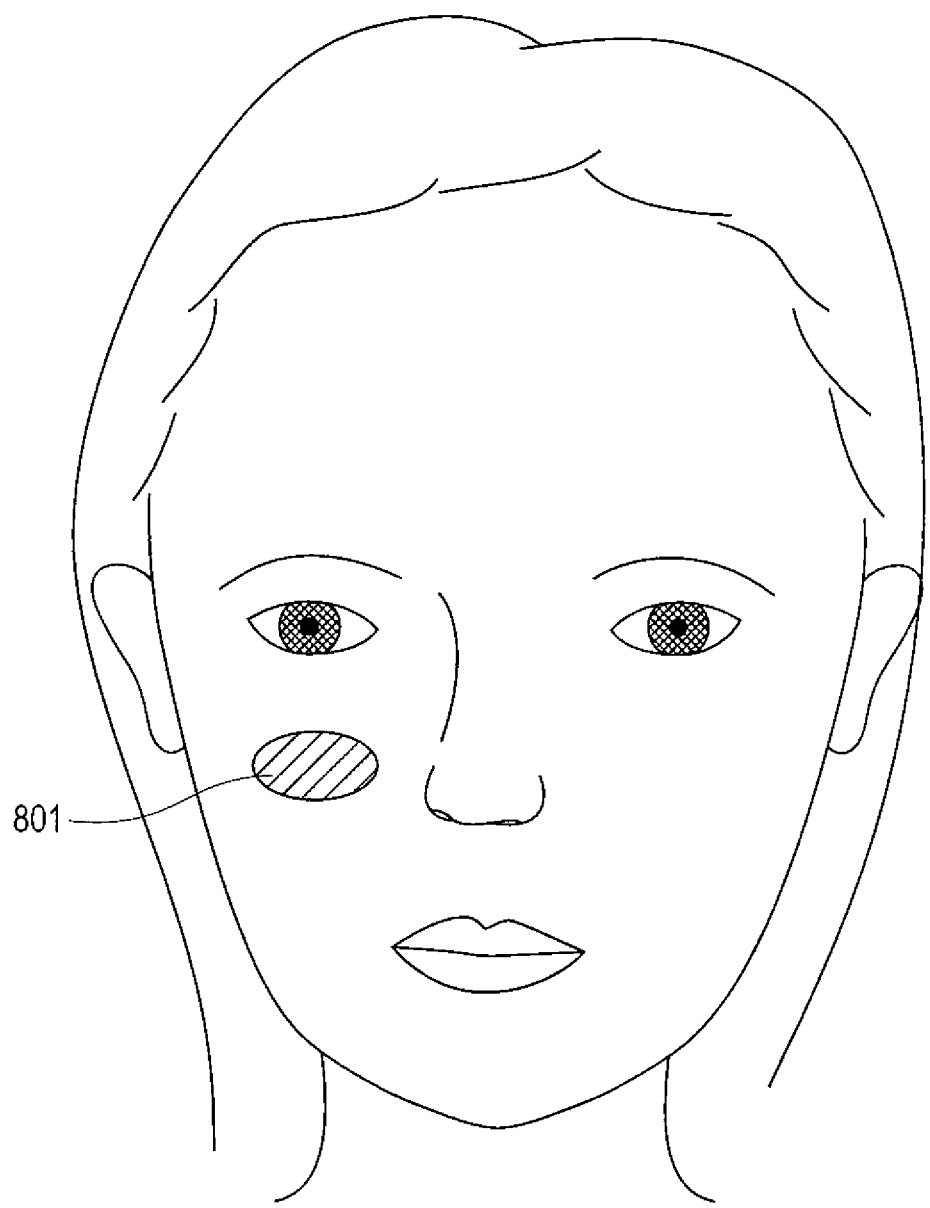
FIG. 11 is a diagram illustrating an example of a user's face made up through the operation for assisting application in the present disclosure.

The user who has seen the message image 804 applies the thin film of the sheet and peels off the backing member of the sheet. As a result, as illustrated in FIG. 11, the makeup article image 801 formed on the thin film is attached to the skin of the user's face, thereby achieving makeup (blusher on the right cheek here).

If the application notification unit 106 receives the second detection result information from the position detection unit 105, on the other hand, the application notification unit 106 issues a notification for prompting the user to move the sheet to the position of the target position image (assist mark target position). For example, the application notification unit 106 displays, on the display apparatus 300, an arrow image (an example of the guide image) 803 indicating an appropriate movement direction of the sheet as illustrated in FIG. 9. In the example illustrated in FIG. 9, the arrow image 803 is superimposed upon the face image 602. The user can understand the appropriate movement direction of the sheet by seeing the arrow image 803. A direction indicated by the arrow image 803 may change in such a way as to point at the position of the target position image in accordance with a direction of the face image 602 even if the user turns her face.

If the calculated distance remains not equal to or smaller than the certain value for longer than a certain period of time after the position detection unit 105 detects the position of the target position image 802, the application notification unit 106 may issue a notification (e.g., display the arrow image 803) for prompting the user to move the sheet to the position of the target position image.

Alternatively, a message image for prompting the user to move the sheet to the position of the target position image may be displayed instead of, or in addition to, the arrow image 803.

The notifications issued by the application notification unit 106 need not necessarily be displayed on the display apparatus 300. For example, the application notification unit 106 may cause a sound output unit (e.g., a speaker) that is not illustrated to output a sound for prompting the user to apply the sheet or a sound for prompting the user to move the sheet to the position of the target position image. Alternatively, the application notification unit 106 may issue the notifications employing both the display performed by the display apparatus 300 and the sound output performed by the sound output unit. Alternatively, the application notification unit 106 may display a moving image for introducing a method for applying a sheet.

Alternatively, the application notification unit 106 may calculate a matching rate (e.g., percentage, a score, etc.) between the detected position of the assist mark image (or the guide image) and the assist mark target position in accordance with the calculated distance. The application notification unit 106 may then notify the user of the matching rate by displaying an image and/or outputting a sound.

Alternatively, the application notification unit 106 may issue a notification to the user on the basis of data other than a calculated distance. For example, the application notification unit 106 may issue a notification to the user in accordance with a direction of the position of the assist mark image from the target position image (upward, downward, leftward, or rightward). In this case, the application notification unit 106 issues a notification such as "Raise the sheet". If depth can be detected, a notification that takes into consideration a distance in a depth direction may be issued. A notification such as "Keep the current position and apply the sheet to the face" is possible.

Apparatus Operation

Next, the operation of image processing apparatus 110 (the operation for assisting application of a sheet) will be described with reference to FIG. 12.

Figure 12:
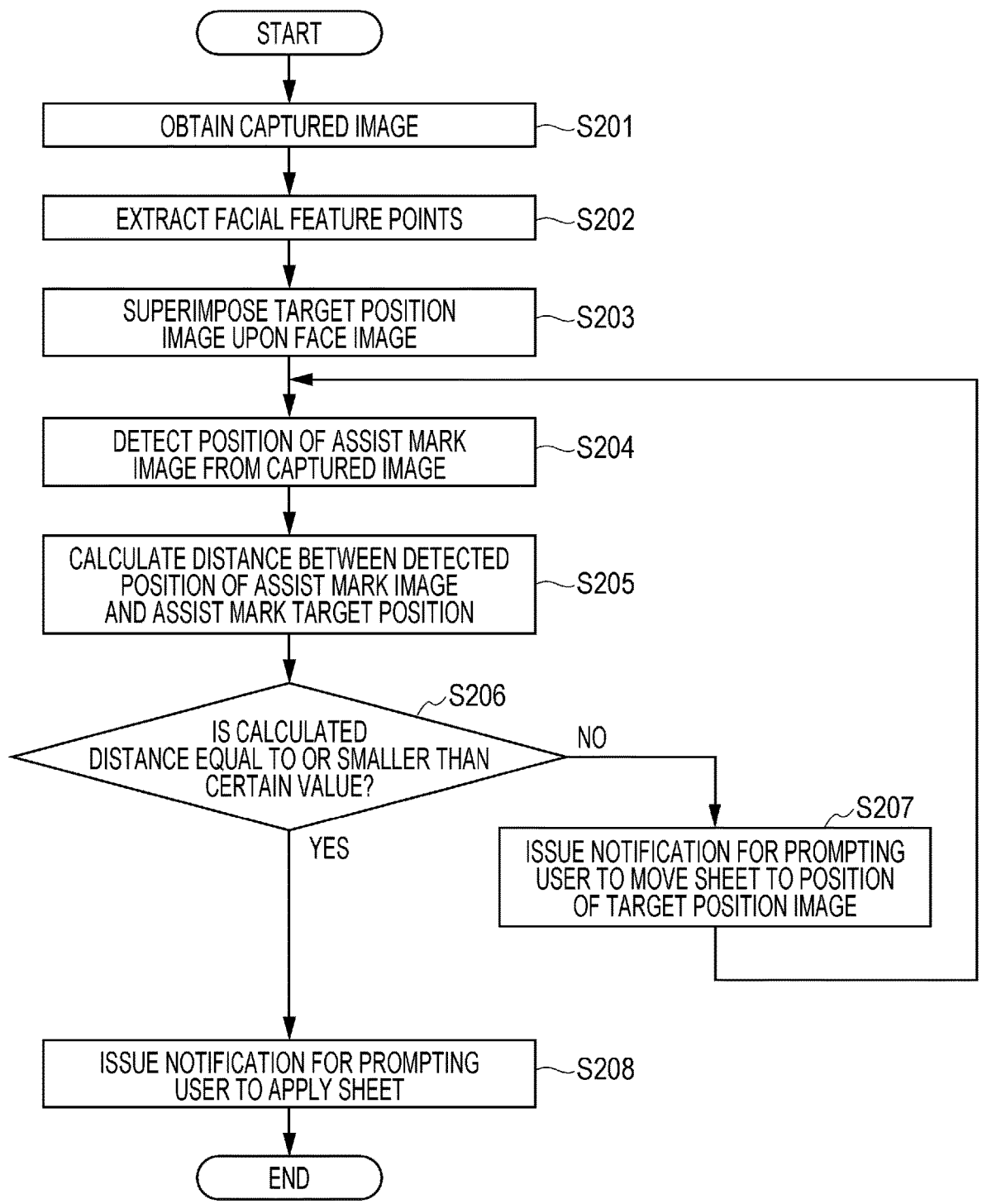
FIG. 12 is a flowchart illustrating an example of the operation for assisting application performed by the image processing apparatus in the present disclosure.

FIG. 12 is a flowchart illustrating an example of the operation of the image processing apparatus 110.

In step S201, the image obtaining unit 101 obtains a captured image including a face image and a sheet image from the imaging apparatus 200. The image obtaining unit 101 then displays the captured image on the display apparatus 300. The image obtaining unit 101 also outputs the captured image to the image analysis unit 102.

In step S202, the image analysis unit 102 extracts facial feature points from the face image included in the captured image received from the image obtaining unit 101 (refer to FIG. 4).

In step S203, the image analysis unit 102 obtains assist mark information (an assist mark image and an assist mark target position) from the storage device 500 and superimposes the assist mark image (target position image) upon the face image on the basis of the extracted facial feature points and the assist mark target position (refer to FIG. 9). The image analysis unit 102 then outputs the captured image and the assist mark information to the position detection unit 105.

In step S204, upon receiving the captured image and the assist mark information from the image analysis unit 102, the position detection unit 105 detects a position of the assist mark image from the captured image (sheet image). The assist mark image refers to an assist mark image printed on the sheet.

In step S205, the position detection unit 105 calculates a distance between the detected position of the assist mark image and an assist mark target position (a position of the target position image superimposed upon the face image) indicated by the assist mark information.

In step S206, the position detection unit 105 determines whether the distance calculated in step S205 is equal to or smaller than a predetermined certain value. If there are a plurality of calculated distances, for example, whether each calculated distance is equal to or smaller than a corresponding certain value is determined.

If the calculated distance is equal to or smaller than the certain value (YES in step S206), the position detection unit 105 outputs, to the application notification unit 106, the first detection result information, which indicates that it is time for the user to apply the sheet. In this case, the flow proceeds to step S208, which will be described later.

If the calculated distance is not equal to or smaller than the certain value (NO in step S206), on the other hand, the position detection unit 105 outputs, to the application notification unit 106, the second detection result information, which indicates that it is not time for the user to apply the sheet. In this case, the flow proceeds to step S207, which will be described hereinafter.

In step S207, upon receiving the second detection result information from the position detection unit 105, the application notification unit 106 issues a notification for prompting the user to move the sheet to the position of the target position image (assist mark target position) (refer to the arrow image 803 illustrated in FIG. 9).

In step S208, upon receiving the first detection result information from the position detection unit 105, the application notification unit 106 issues a notification for prompting the user to apply the sheet (refer to FIG. 10).

Advantageous Effects Produced by Present Embodiment

As described above, the image processing apparatus 100 according to the present embodiment is an apparatus that generates image data used to print images on the sheet 540 appliable to the skin. The image processing apparatus 100 includes the image determination unit 103 that determines the makeup article image 511 whose target position (makeup article target position) on the face is determined in accordance with facial feature points and the assist mark image 512 whose target position (assist mark target position) on the face is determined in accordance with the facial feature points and the printing control unit 104 that generates image data including contents indicating that the determined makeup article image 511 and the assist mark image 512 determined at a position corresponding to a printing position of the determined makeup article image 511 are to be printed on the sheet 540.

The image processing apparatus 110 according to the present embodiment is an apparatus that assists application of a sheet appliable to the skin. The image processing apparatus 110 includes the image obtaining unit 101 that obtains a captured image obtained by capturing images of the face and a sheet on which the makeup article image 801 whose target position (makeup article target position) on the face is determined in accordance with facial feature points is printed and that includes an assist mark part (e.g., the target position image 802) whose target position (assist mark target position) on the face is determined in accordance with the facial feature points, the image analysis unit 102 that extracts the facial feature points from the captured image and that superimposes the target position image 800, which indicates the target position of the assist mark part, upon the captured image on the basis of the extracted facial feature points, the position detection unit 105 that detects a position of the assist mark part (e.g., a position of the target position image 802) from the captured image, and the application notification unit 106 that issues a notification for assisting application of the sheet to the skin on the basis of a relationship between the detected position of the assist mark part (e.g., the position of the target position image 802) and a position of the target position image 800.

As a result, according to the present embodiment, the user can easily apply a sheet at an appropriate position without causing a deviation between a makeup article image printed on the sheet and a target position at which the makeup article image is to be disposed.

Modifications of Present Embodiment

Although an embodiment of the present invention has been described above, the present invention is not limited to the above description, and various modifications are possible. Modifications will be described hereinafter.

First Modification

Although an example in which the image processing apparatus 100 that generates and outputs image data and the image processing apparatus 110 that assist application of a sheet are separate components has been described in the above embodiment, the configuration employed is not limited to this.

The image processing apparatus 100 illustrated in FIG. 3, for example, may also include the position detection unit 105 and the application notification unit 106 illustrated in FIG. 8. Alternatively, the image processing apparatus 110 illustrated in FIG. 8 may also include the image determination unit 103 and the printing control unit 104 illustrated in FIG. 3. As a result, the operation for generating and outputting image data and the operation for assisting application of a sheet are achieved by a single image processing apparatus.

Second Modification

Although a case where the user holds a sheet by hand and applies the sheet has been described in the above embodiment as an example, the method for applying a sheet is not limited to this.

For example, the user may apply a sheet using an application jig capable of holding the sheet instead of holding the sheet by hand.

In this case, for example, the image processing apparatus 110 may control the application jig such that the application jig notifies the user of a timing at which the sheet is to be applied. More specifically, the image processing apparatus 110 recognizes an image of the application jig in a captured image and, if a distance between a position of the image of the application jig and an assist mark target position is equal to or smaller than a certain value, wirelessly transmits a signal to the application jig. Upon receiving the signal, the application jig turns on a lighting unit included in the application jig. As a result, the user can understand that it is time to apply the sheet.

Third Modification

The user may set (change) shapes, relative positions to respective makeup article images, colors, and the like for the assist mark images registered in the assist mark image table illustrated in FIG. 6. As a result, the user can create assist mark images suitable for her habits and skills in terms of application of a sheet.

Fourth Modification

The priority levels registered for the assist mark images in the assist mark image table illustrated in FIG. 6 may be changed in accordance with the number of times of selection performed by the user. If the user selects a certain assist mark image, for example, a certain value may be added to the priority level of the assist mark image. As a result, assist mark images that the user likes are displayed in a prioritized manner during selection of an assist mark image, thereby improving usability.

Fifth Modification

Although a case where the user selects a desired makeup article image from a plurality of makeup article images presented by the image processing apparatus 100 has been described in the above embodiment as an example, the method for selecting a makeup article image is not limited to this.

For example, the user may draw a makeup article with a stylus pen, a finger, or the like on a face image (still image) without makeup, and the image processing apparatus 100 may recognize the makeup article drawn by the user on the basis of facial feature points, instead.

If there is a makeup article drawn by the user in the area 709 defined by the facial feature points 701 to 703 and 706 to 708 illustrated in FIG. 4, for example, the image processing apparatus 100 recognizes the makeup article as eyeshadow. The image processing apparatus 100 then determines a makeup article image indicating eyeshadow as a print image.

Next, the image processing apparatus 100 selects a certain assist mark image (e.g., one having a highest priority level) from, for example, a plurality of types of assist mark images (a surrounding mark image, a one-point mark image, etc.) set for eyeshadow in the assist mark image table illustrated in FIG. 6 and determines the certain assist mark image as a print image.

Here, the image processing apparatus 100 may calculate a distance between coordinates of the center of gravity of the makeup article image and coordinates of facial feature points and determine a target position of the assist mark image (assist mark target position) on the basis of a closest facial feature point.

Although a case where the image processing apparatus 100 selects an assist mark image has been described in the above description as an example, the user may, as with a makeup article, draw an assist mark image.

Sixth Modification

Although a case where the user applies a sheet while viewing a target position image superimposed upon a face image that is a moving image has been described in the above embodiment as an example, the type of face image is not limited to this.

For example, the user may apply a sheet while viewing a face image that is a still image (hereinafter referred to as a "still face image") upon which a target position image is superimposed, instead. The image processing apparatus 110 generates a still face image, for example, and transmits the still face image to a user terminal (e.g., a smartphone). The user causes the user terminal to display the still face image and applies a sheet while comparing the still face image and the face in a mirror.

Alternatively, the still face image may be superimposed upon a face image that is a moving image captured using a selfie (self-taking) function of a camera included in the user terminal. At this time, for example, the visibility of a target position image may be increased on the face image that is a moving image by increasing the transparency of part of the still face image other than the target position image. The user applies a sheet while viewing the target position image on the still face image superimposed upon the face image that is a moving image.

Seventh Modification

If an assist mark image includes a plurality of components (e.g., images of points) like the two-point mark images and the three-point mark images illustrated in FIG. 6, for example, target position images corresponding to the components may be sequentially displayed.

A specific example of this will be described with reference to FIGS. 13A and 13B. A two-point mark image will be taken as an example in the following description.

Figure 13B:
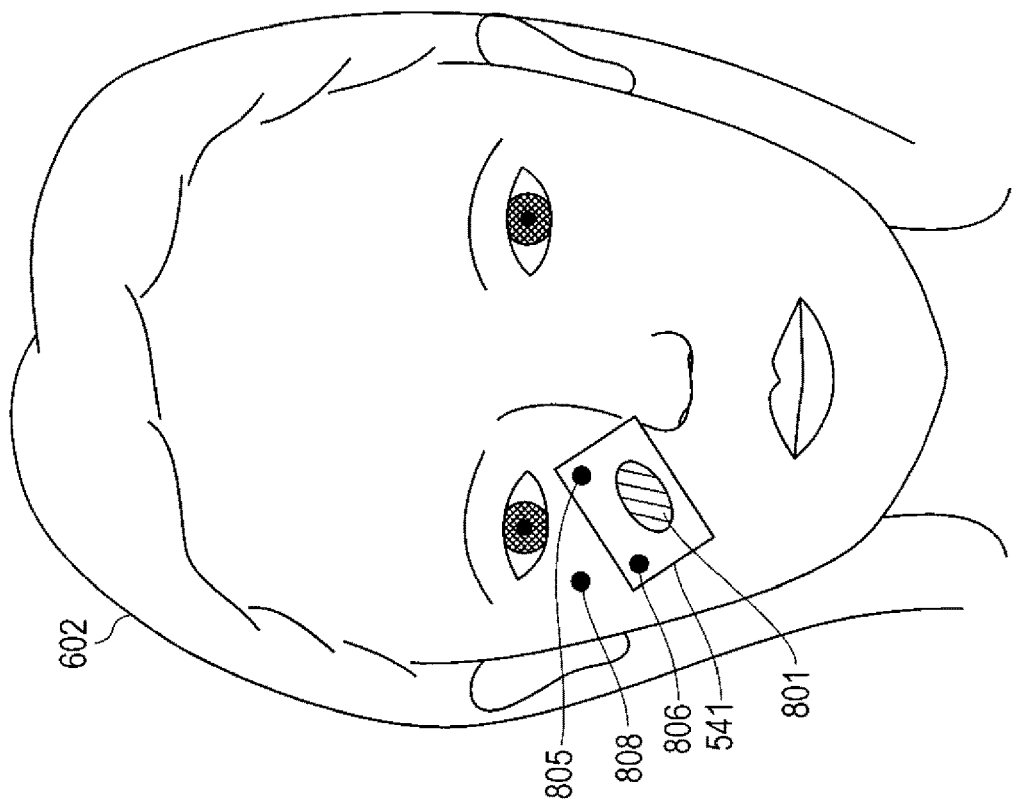
FIGS. 13A and 13B are diagrams illustrating examples of the image displayed during the operation for assisting application in the present disclosure.
Figure 13A:
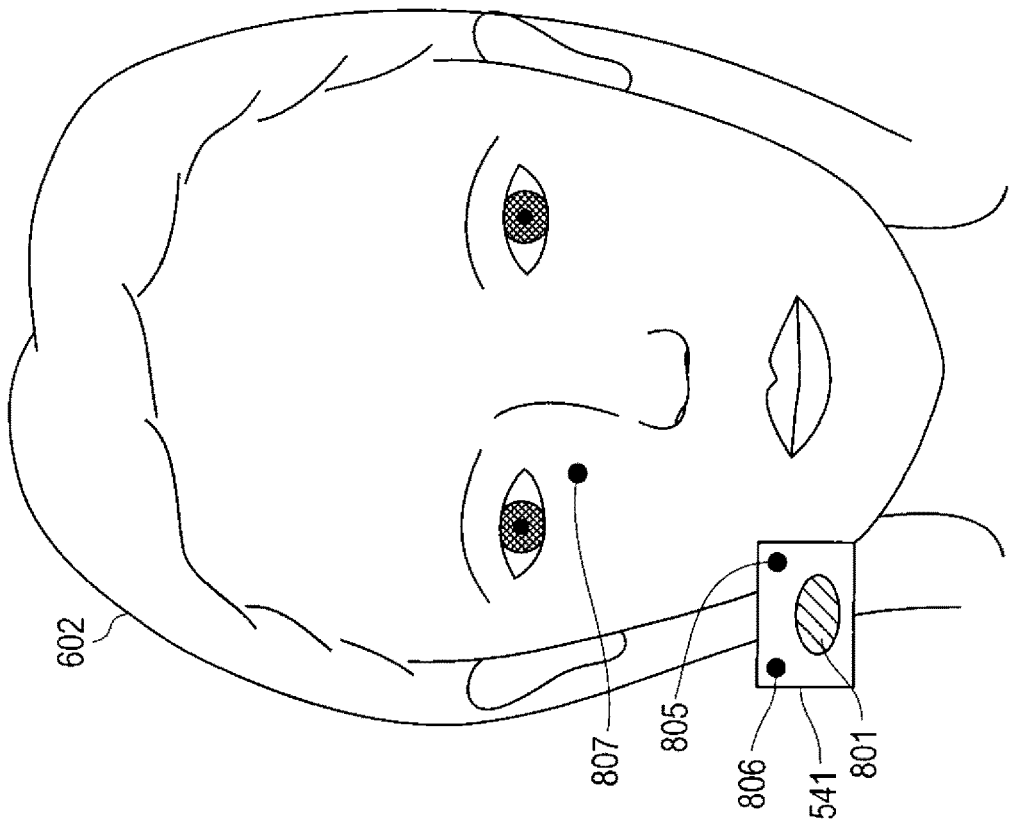

FIG. 13A is a diagram illustrating an example of a captured image before a sheet on which the makeup article image 801 and assist mark images 805 and 806 are printed is applied. The assist mark images 805 and 806 are an example of the components of the two-point mark image.

In FIG. 13A, first, the image analysis unit 102 superimposes a target position image 807 corresponding to the assist mark image 805 upon the face image 602. Here, an image may be displayed and/or a sound may be output in order to notify the user that the assist mark image 805 is an assist mark image to be matched with the target position image 807. The user moves the sheet such that the assist mark image 805 matches the target position image 807.

Next, the position detection unit 105 calculates a distance between a feature point corresponding to the assist mark image 805 and a feature point corresponding to the target position image 807 and determines whether the calculated distance is equal to or smaller than a certain value (e.g., whether the assist mark image 805 and the target position image 807 match). It is assumed here that it is determined that the assist mark image 805 and the target position image 807 match.

FIG. 13B illustrates an example of a captured image at a time when the assist mark image 805 and the target position image 807 match. As illustrated in FIG. 13B, the image analysis unit 102 superimposes a target position image 808 corresponding to the assist mark image 806 upon the face image 602. An image may be displayed and/or a sound may be output in order to notify the user that the assist mark image 806 is an assist mark image to be matched with the target position image 808. The user moves the sheet such that the assist mark image 806 matches the target position image 808 while keeping the assist mark image 805 and the target position image 807 matched.

The user can thus match the assist mark images 805 and 806 printed on the sheet and the target position images 807 and 808 superimposed upon the face image 602, respectively.

Although a two-point mark image including two components (assist mark images 805 and 806) has been taken in the above description as an example, target position images corresponding to components are also sequentially displayed for assist mark images including three or more components.

As described above, according to the present modification, target position images corresponding to a plurality of components are sequentially displayed, and the user can recognize the target position images and match assist mark images on a sheet and target position images more easily than when a plurality of target position images are displayed at the same time.

Eighth Modification

Although an assist mark image printed on a sheet has been taken in the above embodiment as an example of an assist mark part for aiding (assisting) application of the sheet to the skin, the type of assist mark part is not limited to this.

Figure 14A:
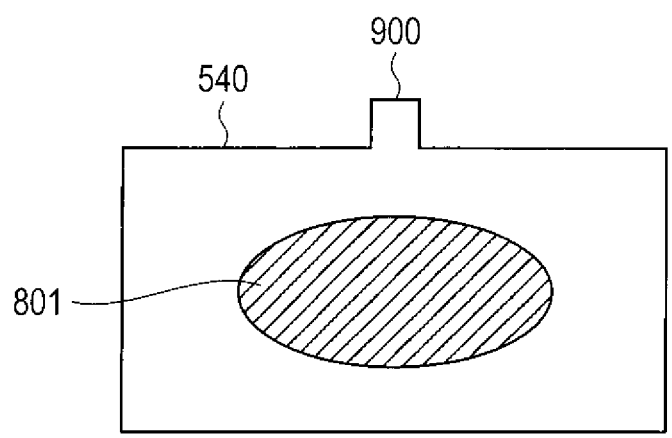
FIGS. 14A and 14B are diagrams illustrating other examples of an assist mark part in the present disclosure.

For example, the assist mark part may be part of a sheet, instead. FIG. 14A illustrates a specific example of this. As illustrated in FIG. 14A, a protrusion 900 (an example of the assist mark part) is formed on a circumference of the sheet 540. The makeup article image 801 is printed at a relative position to the preset protrusion 900.

In this case, the image processing apparatus 110 may identify an assist mark target position during generation of image data on the basis of makeup article information (e.g., information regarding the makeup article image 801, a makeup article target position of the makeup article image 801, relative positions of the makeup article image 801 and the protrusion 900, and the like) stored in the storage device 500, for example, and superimpose a target position image having the same shape and size as the protrusion 900 upon a face image at the assist mark target position.

Although a case where only one protrusion 900 is provided has been described in FIG. 14A as an example, a plurality of protrusions 900 may be provided, instead. A shape of part of a sheet used as the assist mark part is not limited to the protrusion 900 illustrated in FIG. 14A. For example, the sheet 540 whose circumference is partly notched may be used as the assist mark part, instead.

Figure 14B:
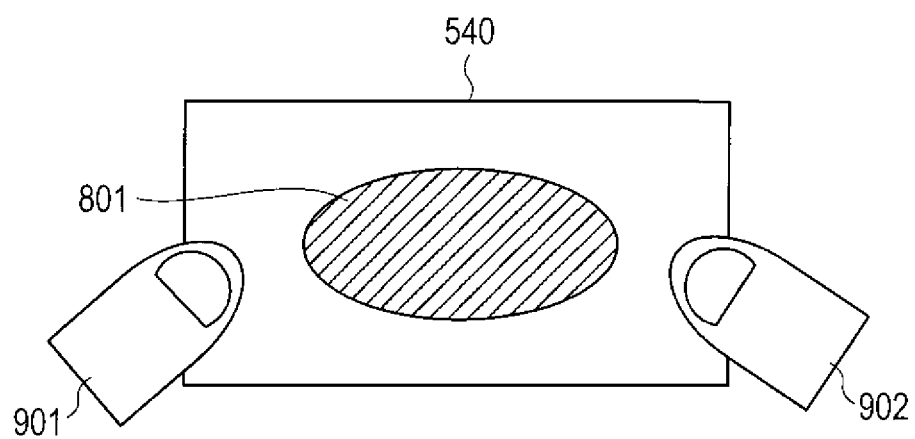

Alternatively, for example, the assist mark part may be an object that holds a sheet (e.g., fingers or an application jig). FIG. 14B illustrates a specific example of this. As illustrated in FIG. 14B, the sheet 540 is held by the user's fingers 901 and 902 (an example of the assist mark part). Although not illustrated, holding areas to be recognized by the user as parts to be held by her fingers are printed in a certain shape, a certain size, and a certain color at parts of the sheet 540 held by the fingers 901 and 902. The makeup article image 801 is printed at a position relative to the preset holding areas.

In this case, the image processing apparatus 110 may identify assist mark target positions during generation of image data on the basis of makeup article information (e.g., information regarding the makeup article image 801, a makeup article target position of the makeup article image 801, relative positions of the makeup article image 801 and the holding areas, and the like) stored in the storage device 500, for example, and superimpose target position images having the same shape and size as the fingers or the holding areas upon a face image at the assist mark target positions.

Ninth Modification

When a plurality of makeup article images are printed on a sheet, assist mark images corresponding to the plurality of makeup article images are also printed. At this time, an assist mark image corresponding to a certain makeup article image might overlap another makeup article image or two assist mark images might overlap. The image processing apparatus 100, therefore, may generate image data such that, if it is determined on the basis of makeup article target positions and assist mark target positions that a certain assist mark image overlaps an unrelated makeup article image or another assist mark image as a result of printing, the certain assist mark image is not to be printed.

Tenth Modification

In the user identification information stored in the storage device 500, pieces of information (hereinafter collectively referred to as "user-related information") such as the user's age, gender, nationality, place of residence, and birthplace and identification information regarding cosmetics used by the user, worries of the skin, ideal skin conditions, and treatment histories (names of medical facilities, dates of treatment, places of treatment, etc.) at the medical facilities (dermatology, beauty dermatology, cosmetic surgery, etc.) may be associated with one another.

The user-related information is, for example, information obtained through a questionnaire completed by the user or counseling conducted for the user in a cosmetic store, a medical facility, or the like. The user-related information is input by a person at the store, the medical facility, or the like or the user herself using a certain terminal (e.g., a PC, a smartphone, a tablet, etc.). The user-related information is transmitted to the storage device 500 from the certain terminal and associated with the user identification information stored in the storage device 500. The user-related information may be input to the image processing apparatus 100 or the storage device 500, instead.

The image processing apparatus 100 may associate the user-related information (e.g., nationality, age, gender, etc.) and a makeup article image and an assist mark image selected by the user and output the user-related information, the makeup article image, and the assist mark image to a certain apparatus (e.g., in a development company or a selling company of cosmetics). By associating these pieces of information with one another, a relationship between an attribute of the user, a type of makeup article image, and a type of assist mark image can be identified. This can be utilized for development of cosmetics, advice for customers, recommendation of products, or the like.

Eleventh Modification

The method for extracting facial feature points, the method for extracting facial components, the method for determining a factor type, the method for determining a printing material, and the printing method are not limited to the above-described examples. For example, a known classification method, a pattern recognition method, a clustering method, and an optimization method may be employed for the method for extracting facial feature points, the method for extracting facial components, and the method for determining a factor type.

The known classification method may be, for example, a decision tree analysis, a neural network (includes deep learning), or naive Bayes. The known pattern recognition method may be, for example, a neural network (includes deep learning) or a support vector machine (SVM). The known clustering method may be, for example, k-nearest neighbors (k-NN), k-means, or hierarchical clustering. The known optimization method may be, for example, a genetic algorithm.

Twelfth Modification

Some components of the image processing apparatus 100 or 110 may be physically separated from the other components of the image processing apparatus 100 or 110. In this case, each of the plurality of separated components needs to include a communication section for communicating with the other components. Some functions of the image processing apparatus 100 or 110, for example, may be achieved by a cloud. The image processing apparatus 100 or 110 and the printing apparatus 400 may be integrated with each other. The arrangement of the image processing apparatus 100 or 110 and the printing apparatus 400 is not limited to the above-described example. For example, the printing apparatus 400 may be installed in a place separated from the image processing apparatus 100 or 110, such as a printing factory, and receive image data through a communication network such as the Internet.

Thirteenth Modification

The image processing apparatus may be intended not only for the face but also for other body parts such as the back, décolletage, arms, hands, belly, and legs. When a sheet is applied to the back, for example, an image of the back is captured. A plurality of back feature points can then be calculated from a bottom of the neck (calculated from inflection points between the neck and the shoulders), the shoulder blades, and midpoints of lines connecting the left and right shoulder blades. A sheet can be similarly generated in accordance with the feature points and applied.

Fourteenth Modification

How to handle a sheet when a plurality of pairs of images (makeup article images and corresponding assist mark images) are collectively printed on a sheet will be described. Assist marks corresponding to the makeup article images may be of the same type or of different types.

If eyeshadow and blusher are printed on a sheet, for example, whether assist marks are within an appropriate range on a front surface of the face is checked with a certain degree of tolerance. Spoken and/or written guidance and/or guidance based on assist marks are then performed such that the sheet is applied in one direction such as from a bottom to a top of the face.

Summary of Present Disclosure

The image processing apparatus in the present disclosure is an image processing apparatus that generates image data used to print images on a sheet appliable to the skin. The image processing apparatus includes an image determiner that determines a makeup article image whose target position on a face is determined in accordance with facial feature points and an assist mark image whose target position on the face is determined in accordance with the facial feature points and a printing controller that generates the image data including contents indicating that the determined makeup article image and the determined assist mark image are to be printed on the sheet, the determined assist mark image printed at a position corresponding to a printing position of the determined makeup article image.

In the image processing apparatus, the makeup article image may be selected by a user from a plurality of predetermined types.

In the image processing apparatus, the assist mark image may be selected by the user from a plurality of predetermined types.

In the image processing apparatus, a priority level may be set for each of the plurality of types of assist mark images. The assist mark images as options may be presented to the user in descending order of the priority level.

In the image processing apparatus, the priority level may be set in accordance with a number of times that each assist mark image has been selected by the user.

In the image processing apparatus, the printing controller may output the generated image data to a printing apparatus.

An image processing apparatus in the present disclosure is an image processing apparatus that assists application of a sheet appliable to skin. The image processing apparatus includes an image obtainer that obtains a captured image, which is obtained by capturing images of a face and the sheet on which a makeup article image whose target position on the face is determined in accordance with facial feature points is printed and that includes an assist mark part whose target position on the face is determined in accordance with the facial feature points, an image analyzer that extracts the facial feature points from the captured image and superimposes a target position image indicating the target position of the assist mark part upon the captured image on the basis of the extracted facial feature points, a position detector that detects a position of the assist mark part from the captured image, and an application notifier that issues a notification for assisting the application of the sheet to the skin on the basis of a relationship between the detected position of the assist mark part and a position of the target position image.

In the image processing apparatus, if a distance between the detected position of the assist mark part and the position of the target position image becomes equal to or smaller than a certain value, the application notifier may issue a notification for prompting the user to apply the sheet to the skin.

In the image processing apparatus, if the distance is not equal to or smaller than the certain value, the application notifier may issue a notification for prompting the user to move the sheet.

In the image processing apparatus, if the distance remains not equal to or smaller than the certain value for longer than a certain period of time after the position of the assist mark part is detected, the application notifier may issue a notification for prompting the user to move the sheet.

In the image processing apparatus, if the assist mark part includes a plurality of components, the image analyzer may display a first target position image corresponding to a first components among the plurality of components. If a distance between a position of the first target position image and a certain position in the assist mark part detected from the captured image becomes equal to or smaller than a certain value, the image analyzer may display a second target position image corresponding to a second component among the plurality of components.

In the image processing apparatus, the assist mark part may be a part of the sheet or an object holding the sheet or an assist mark image printed on the sheet or a member backing the sheet at a position corresponding to a printing position of the makeup article image.

A method for processing an image in the present disclosure is a method for processing an image by which image data used to print images on a sheet appliable to skin is generated. The method includes determining a makeup article image whose target position on a face is determined in accordance with facial feature points and an assist mark image whose target position on the face is determined in accordance with the facial feature points and generating the image data including contents indicating that the determined makeup article image and the determined assist mark image are to be printed on the sheet, the determined assist mark image printed at a position corresponding to a printing position of the determined makeup article image.

A method for processing an image in the present disclosure is a method for processing an image by which application of a sheet appliable to skin is assisted. The method includes obtaining a captured image, which is obtained by capturing images of a face and the sheet on which a makeup article image whose target position on the face is determined in accordance with facial feature points is printed and that includes an assist mark part whose target position on the face is determined in accordance with the facial feature points, extracting the facial feature points from the captured image and superimposing a target position image indicating the target position of the assist mark part upon the captured image on the basis of the extracted facial feature points, detecting a position of the assist mark part from the captured image, and issuing a notification for assisting the application of the sheet to the skin on the basis of a relationship between the detected position of the assist mark part and a position of the target position image.

The image processing apparatus and the method for processing an image in the present disclosure are effective as an image processing apparatus and a method for processing an image capable of easily applying a sheet at an appropriate position.

What is claimed is:

1. An image processing apparatus that generates image data used to print images on a sheet appliable to skin, the image processing apparatus comprising:
   processing circuitry configured to:
      determine a makeup article image whose target position on a face is determined in accordance with facial feature points and an assist mark image that is provided to assist a user to apply the sheet to the skin and whose target position on the face is determined in accordance with the facial feature points,
      generate the image data including contents indicating that the determined makeup article image and the determined assist mark image are to be printed on the sheet, the determined assist mark image printed at a position corresponding to a printing position of the determined makeup article image,
      calculate a distance between coordinates of a center of gravity of the makeup article image and coordinates of the facial feature points, and
      determine the a target position of the assist mark image on the basis of a closest facial feature point that is determined from the calculated distance between the coordinates of the center of gravity of the makeup article image and the coordinates of the facial feature points.

2. The image processing apparatus according to claim 1, wherein the makeup article image is selected by the user from a plurality of predetermined types.

3. The image processing apparatus according to claim 2, wherein the assist mark image is selected by the user from a plurality of predetermined types.

4. The image processing apparatus according to claim 3, wherein the processing circuitry is configured to set a priority level for each of the plurality of types of assist mark images, and
wherein the processing circuitry is configured to present the assist mark images as options to the user in a descending order of the priority level.

5. The image processing apparatus according to claim 4, wherein the processing circuitry is configured to set the priority level in accordance with a number of times that each assist mark image has been selected by the user.

6. The image processing apparatus according to claim 1, wherein the processing circuitry is configured to output the generated image data to a printer.

7. The image processing apparatus according to claim 1, wherein the makeup article image is corresponding to a type of factor in discoloration in a discolored area, and includes contents indicating one or more types of medicine.

8. An image processing apparatus that assists application of a sheet appliable to skin, the image processing apparatus comprising:
processing circuitry configured to:
obtain a captured image, which is obtained by capturing images of a face and the sheet on which a makeup article image whose target position on the face is determined in accordance with facial feature points is printed and that includes an assist mark that is provided to assist a user to apply the sheet to the skin and whose target position on the face is determined in accordance with the facial feature points,
extract the facial feature points from the captured image and superimpose a target position image indicating the target position of the assist mark upon the captured image on the basis of the extracted facial feature points,
detect a position of the assist mark from the captured image,
issue a notification to assist the application of the sheet to the skin on the basis of a relationship between the detected position of the assist mark and a position of the target position image, and
determine a target position of the assist mark based on a closest facial feature point between coordinates of a center of gravity of the makeup article image and coordinates of the facial feature points.

9. The image processing apparatus according to claim 8, wherein, when a distance between the detected position of the assist mark and the position of the target position image becomes equal to or smaller than a certain value, the processing circuitry issues a notification prompting the user to apply the sheet to the skin.

10. The image processing apparatus according to claim 9, wherein, when the distance is not equal to or smaller than the certain value, the processing circuitry issues a notification prompting the user to move the sheet.

11. The image processing apparatus according to claim 9, wherein, when the distance remains not equal to or smaller than the certain value for longer than a certain period of time after the position of the assist mark is detected, the processing circuitry issues a notification prompting the user to move the sheet.

12. The image processing apparatus according to claim 8, wherein, when the assist mark includes a plurality of components, the processing circuitry displays a first target position image corresponding to a first component among the plurality of components, and
wherein, when a distance between a position of the first target position image and a certain position in the assist mark detected from the captured image becomes equal to or smaller than a certain value, the processing circuitry displays a second target position image corresponding to a second component among the plurality of components.

13. The image processing apparatus according to claim 8, wherein the assist mark is a part of the sheet or an object holding the sheet or an assist mark image printed on the sheet or a structure backing the sheet at a position corresponding to a printing position of the makeup article image.

14. The image processing apparatus according to claim 8, wherein the assist mark is printed on holding areas by the user of the sheet.

15. A method for processing an image by which image data used to print images on a sheet appliable to skin is generated, the method comprising:
determining a makeup article image whose target position on a face is determined in accordance with facial feature points and an assist mark image that is provided to assist a user to apply the sheet to the skin and whose target position on the face is determined in accordance with the facial feature points, the target position of the assist mark image being determined based on a closest facial feature point between coordinates of a center of gravity of the makeup article image and coordinates of the facial feature points; and
generating the image data including contents indicating that the determined makeup article image and the determined assist mark image are to be printed on the sheet, the determined assist mark image printed at a position corresponding to a printing position of the determined makeup article image.

16. A method for processing an image by which application of a sheet appliable to skin is assisted, the method comprising:
obtaining a captured image, which is obtained by capturing images of a face and the sheet on which a makeup article image whose target position on the face is determined in accordance with facial feature points is printed and that includes an assist mark that is provided to assist a user to apply the sheet to the skin and whose target position on the face is determined in accordance with the facial feature points;
extracting the facial feature points from the captured image and superimposing a target position image indicating the target position of the assist mark upon the captured image on the basis of the extracted facial feature points;
detecting a position of the assist mark from the captured image; and
issuing a notification to assist the application of the sheet to the skin on the basis of a relationship between the detected position of the assist mark and a position of the target position image.

* * * * *